United States Patent [19]

Dehrmann et al.

[11] Patent Number: 5,575,363

[45] Date of Patent: Nov. 19, 1996

[54] HYDROKINETIC TORQUE CONVERTER WITH LOCKUP CLUTCH

[75] Inventors: Uwe Dehrmann, Würzburg; Peter Volland, Rannungen; Wolfgang Kundermann, Schweinfurt; Hans W. Wienholt, Dortmund; Ruthard Knoblach, Bergrheinfeld; Herbert Schmid, Münnerstadt, all of Germany

[73] Assignee: Fichtel & Sachs AG, Schweinfurt, Germany

[21] Appl. No.: 358,852

[22] Filed: Dec. 19, 1994

[30] Foreign Application Priority Data

Dec. 22, 1993 [DE] Germany .......................... 43 43 804.0
Jul. 6, 1994 [DE] Germany .......................... 43 23 640.9

[51] Int. Cl.[6] ............................ F16H 45/02; F16H 41/30
[52] U.S. Cl. .......................................... 192/3.3; 192/113.3
[58] Field of Search ........................ 192/113.36, 113.34, 192/113.3, 3.3, 3.29

[56] References Cited

U.S. PATENT DOCUMENTS

| | | | |
|---|---|---|---|
| 3,213,983 | 10/1965 | Smirl et al. ............ | 192/3.3 |
| 3,648,814 | 3/1972 | Barron . | |
| 4,181,203 | 1/1980 | Malloy ................... | 192/3.3 |
| 4,194,604 | 3/1980 | Nichols et al. . | |
| 4,540,076 | 9/1985 | Bopp . | |
| 4,926,988 | 5/1990 | Kundermann ........... | 192/3.3 |
| 4,930,608 | 6/1990 | Schenk et al. . | |
| 4,969,543 | 11/1990 | Macdonald . | |
| 5,209,330 | 5/1993 | Macdonald ............. | 192/3.29 |
| 5,215,173 | 6/1993 | Gimmler . | |
| 5,248,016 | 9/1993 | Umezawa . | |
| 5,310,033 | 5/1994 | Shibayama ............ | 192/113.34 X |
| 5,383,540 | 1/1995 | Macdonald ............ | 192/3.3 X |

FOREIGN PATENT DOCUMENTS

| | | | |
|---|---|---|---|
| 0002447 | 6/1979 | European Pat. Off. . | |
| 0078651 | 5/1983 | European Pat. Off. . | |
| 0428248 | 5/1991 | European Pat. Off. . | |
| 0533426 | 3/1993 | European Pat. Off. . | |
| 3828421 | 3/1989 | Germany . | |
| 4116051 | 1/1992 | Germany . | |
| 4121586 | 1/1993 | Germany . | |
| 5830532 | 2/1983 | Japan . | |
| 5-306742 | 11/1993 | Japan ................. | 192/113.34 |
| 6-42606 | 2/1994 | Japan ................. | 192/113.36 |
| 9313338 | 7/1993 | WIPO . | |
| WO93/13339 | 7/1993 | WIPO . | |

OTHER PUBLICATIONS

Abstract of Japan document 58–30532, Takaniya, Feb. 1983.

*Primary Examiner*—Rodney H. Bonck
*Attorney, Agent, or Firm*—Nils H. Ljungman and Associates

[57] ABSTRACT

A hydrokinetic torque converter with a lock-up clutch which is located axially between the turbine wheel and the converter housing comprises a piston which, along with the converter housing, defines a chamber. The chamber is connected by means of at least one essentially radial flow guide to a longitudinal hole in the driven shaft. When oil which has been supplied by the converter circuit and has penetrated into the chamber in the vicinity of the friction lining flows through the chamber, the oil can be transported radially inward for discharge by means of the flow guide toward the converter axis, until it can be introduced into the driven shaft inside a ring-shaped zone surrounding the converter-axis which promotes the formation of a vortex when the converter housing is in rotation, and can then be transported via the longitudinal hole in the driven shaft to the reservoir.

20 Claims, 12 Drawing Sheets

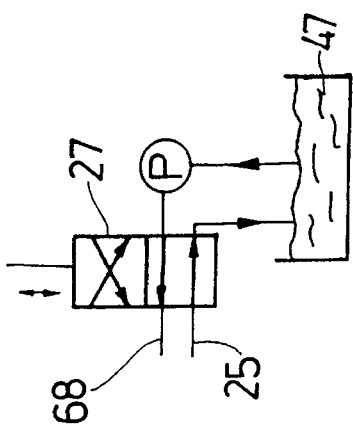

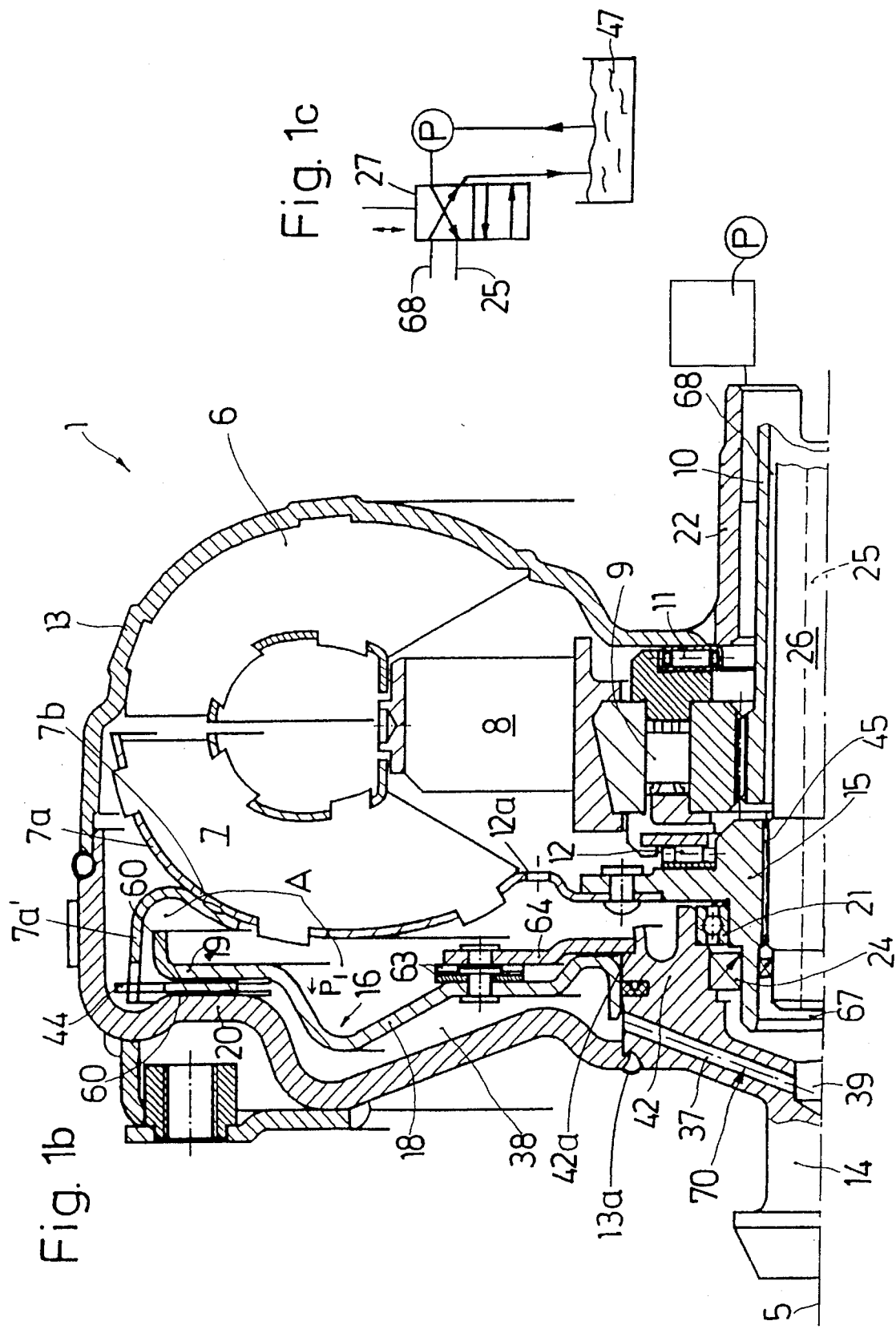

5,575,363

HYDROKINETIC TORQUE CONVERTER WITH LOCKUP CLUTCH

BACKGROUND OF THE INVENTION

1. Field of the Invention

The present invention generally relates to a torque converter, such as a hydrokinetic torque converter, which torque converter includes a pump wheel driven by an internal combustion engine, a turbine wheel connected to a driven shaft, and a stator, which together form a converter circuit filled with hydraulic fluid, preferably oil. The torque converter also includes a lock-up clutch, which lock-up clutch has at least one piston, which piston can be connected by means of at least one friction lining to the converter housing. The piston, along with the converter housing, defines a chamber, whereby the chamber is connected by at least one flow guide to a passage. The at least one flow guide can he disposed essentially radially with respect to the passage, and the passage can preferably extend essentially axially in the driven shaft. The torque converter also generally includes a supply system with switchable feed and discharge lines, wherein at least one of the lines runs to the passage and the another of the lines runs to the converter circuit to feed the converter circuit.

2. Background of the Invention

A torque converter, of the type described above, is disclosed in German Patent Application No. 41 21 586 A1, which corresponds to U.S. Pat. No. 5,215,173, according to which oil can be fed by means of a hollow support shaft from a reservoir to the converter in a first flow direction, which results in a connection of the piston of a lock-up clutch to the converter housing by means of at least one friction lining. For a second flow direction of the oil in which the piston is separated from the converter housing, a driven shaft oriented coaxially to the support shaft carries the flow in the area of a passage in the form of a longitudinal hole. In the latter case, after the oil flows through a space connected to the output side of the longitudinal hole and a flow guide which runs radially outside the longitudinal hole, the oil is transported into a chamber formed between the converter housing and the piston. In this case, the space connected to the output side of the longitudinal hole is designed, with respect to the axis of rotation of the driven shaft, so that it has a diameter which is significantly smaller than the diameter of a second space which is also connected to the longitudinal hole in the driven shaft, from which second space a throttle leads to the side of the piston facing away from the converter housing.

As a result of the smaller diameter of the first space, and the resulting flow guide which extends far radially inward, it is possible to prevent an overflow of the oil which accumulates in the second space into the flow guide, and thus into the chamber.

When the piston separates from the converter housing, some of the oil guided through the longitudinal hole in the driven shaft is pumped by means of the throttle hole between the piston and the turbine wheel.

This oil is intended to cool the piston, principally in the vicinity of the friction surfaces, which is important primarily when the lock-up clutch is in slip operation. But that presents the following problem:

The flow of oil, since it comes into contact with the piston in the vicinity of the interface between the turbine wheel and the piston, exerts its cooling action radially deep inside the friction lining, so that it is essentially not possible to sufficiently reduce the heat which occurs at the friction lining. In the vicinity of the at least one friction lining, the piston and the piston housing can therefore become so hot that the oil can break down in this area.

European Patent Application No. 0 428 248 A2 discloses an additional torque converter with a look-up clutch in which the piston is operated with a specified slip. To be able to dissipate the heat which is generated in the area covered by the friction lining on converter elements such as the piston or converter housing, channels are formed in the friction lining along the entire circumference which channels run radially outward, starting from a connection opening to the converter circuit on the side of the piston facing the turbine wheel. The oil used to cool the friction lining is transported via the channels from the converter circuit, over or through the friction lining, end into the area radially outside the piston, where it can be fed back into the converter circuit.

As a result of such a configuration of the friction lining, it is of course possible to cool the converter elements in the vicinity of the friction lining, but it is essentially not possible to cool a large surface area. The oil which has been heated after flowing through the friction lining is also returned to the converter circuit, which can be considered to be a disadvantage.

OBJECT OF THE INVENTION

The object of the present invention is to design a torque converter so that converter elements, which have at least one friction lining between them, can be cooled over a large area, and the oil flowing through the friction lining can be extracted from the converter circuit essentially without obstacles and over the shortest possible distance.

SUMMARY OF THE INVENTION

The present invention teaches that this object can be achieved in that, when the chamber is carrying a flow of oil, which oil (supplied by the converter circuit) has penetrated into the vicinity of the friction lining into the chamber, the oil can be transported radially inward, preferably for discharge into the flow guide, towards the converter axis. Preferably, the oil can be discharged far enough towards the converter axis so that the oil can be introduced into the passage in the driven shaft in the vicinity of a vortex zone, which vortex zone preferably surrounds the axis of the converter in an essentially annular fashion when the converter housing is rotating.

By conducting oil from the converter circuit into the chamber, preferably at a small radial distance from the friction lining, it becomes possible to absorb and discharge heat essentially directly from the friction surface on the friction lining. Since the oil can then be transported along the piston, the piston is preferably coated radially inward with oil over essentially its entire surface, to the vicinity of its bearing. The piston can therefore be cooled uniformly.

It has been discovered that with oil flowing inwardly in the vicinity of a space surrounding the axis of rotation of the converter housing, if the space has a sufficient diameter, under the action of the Coriolis force during the rotation of the converter housing, there can be a deflection of the oil particles from their radial direction, so that they move radially inwardly on curved trajectories and create a vortex or eddy. The radial dimension of this vortex preferably is a function of the angular velocity of the converter housing and the radial velocity of the oil particles. On the driven shaft, preferably in the vicinity of the wall of the passage, the vortex can cause large areas of separation for incoming oil particles, which can lead to a significant restriction of the available flow width, and thus to a significant loss of pressure. This loss of pressure would typically be propagated radially outward into the chamber, thereby reducing the application force and thus the torque which could be transmitted to the piston. To solve this problem, the present invention teaches that oil can be transported via at least one flow guide, and thus the deflection of the oil particles in the radial direction can essentially be prevented, which means that the formation of the vortex can essentially be eliminated.

Consequently, the oil can preferably be released radially inwardly, essentially only in the zone in which a vortex could have formed, so that the oil can preferably flow out without a restriction in the passage of the drive shaft, and via this passage into a reservoir. As a result of the type of oil guidance as taught by the present invention, the present invention also teaches that it can be possible to remove the oil, which is heated after flowing through the friction linings, from the converter as quickly as possible.

In accordance with one embodiment of the present invention, oil can preferably be transported from the converter circuit, at a small radial distance from the friction lining, into the chamber. Thus, it can be possible to absorb heat essentially directly from the converter elements which interact with the friction lining, such as the piston of a lock-up clutch or the converter housing. Since the transport of the oil can preferably take place radially inwardly along the converter elements, these elements can preferably be coated with oil over essentially their entire surface down to the corresponding bearing area, and can thus be cooled uniformly.

The cooling action on the piston, as discussed above, can be achieved in an optimal manner if the oil of the converter circuit is preferably fed to the friction lining at a slight distance radially outside the friction lining, and is transported, via channels in the friction lining, into the chamber. Additional configurations of the lock-up clutch are possible. For example, the lock-up clutch can have a plate, which plate can preferably be located between the housing and the piston, and which plate can preferably have channels on both sides thereof. In accordance with this particular embodiment, the housing and the piston can each preferably have a friction lining. In accordance with an additional embodiment, the channels can preferably be disposed on each of the housing and the piston, the plate being disposed therebetween, and the plate having friction linings disposed on both sides thereof.

In accordance with yet en additional embodiment of the present invention, there can be channels on one of the two converter elements, i.e. the housing or the piston, with a friction lining on the other of the two converter elements, this embodiment preferably illustrates how a flow of the oil through the friction lining can be achieved, which flow can be advantageous for cooling purposes. In contrast, in accordance with an additional embodiment, the contact surface between a converter element, such as the converter housing, piston, or a plate located between them, can each preferably be designed with a corresponding friction lining, since the oil can flow inside the plate, and can thus cool the friction lining from the inside out. Smooth, or flat contact surfaces between the converter element and the corresponding friction lining can contribute to a long useful life of the friction lining.

When the channels run essentially radially, the oil flows over relatively short distances through the passages. In contrast, when the channel is designed as a spiral, in accordance with one embodiment, the time the oil remains in the channel can become significant on account of the very long flow distance of the oil. This configuration can essentially guarantee an increased effectiveness for the heat exchange. In accordance with one improvement, an increase in the time the oil remains in the passage and thus an optimization of the heat exchange, can preferably be achieved by means of an insert, which insert can cause a drop in the pressure. In addition, in accordance with a preferred embodiment, these inserts can preferably be made of a sintered material, and can also be in the form of a steel braid.

In accordance with one advantageous configuration of a plate, the plate can be located between a friction lining of the converter housing and a friction lining of the piston. The plate can have two elements which are preferably curved toward one another in the middle, and one groove which can extend in the circumferential direction. The elements,can be welded to one another, and a channel, which channel preferably extends radially inward, can empty into the chamber. In accordance with this embodiment, the plate can preferably have a relatively large surface for the heat exchange from the friction lining in contact with its outside to the oil current flowing inside the elements, to promote an effective transfer of heat.

In accordance with one preferred embodiment, the oil can preferably be transported through the chamber over the shortest possible distance, and can still cool essentially the entire surface of the piston to its bearing point. In this embodiment, of course, the friction linings essentially are not cooled, but as a result of the discharge of the heat along the rest of the piston, the heat generated in the friction lining can preferably be discharged radially inward.

Since the flow guide exists in any case when the piston separates from the converter housing, in accordance with one preferred embodiment of the present invention, it can be possible to realize a cooling of the friction lining with no added expense or effort.

In other words, and in accordance with one embodiment of the present invention, a flow guide can be designed to serve et least two purposes. The first purpose described above can preferably be to radially direct the oil flowing from the chamber to the passage in the drive shaft. The second purpose can come into play when the clutch is to be deactivated and thus the oil will preferably be flowing in the opposite direction from the flow guide to the chamber and towards the friction lining or linings. As such, the oil flowing from the flow passage, which flow can preferably cause the piston to move away from the housing, can preferably serve to cool the friction lining in the opposite direction.

In this case, two theoretically different solutions are conceivable, whereby one solution provides a driven shaft which driven shaft is preferably open on its engine-side end, and the at least one flow guide preferably empties in the axial direction next to this side of the driven shaft. The second embodiment or solution provides that the driven shaft is closed on the engine-side end, and the emptying opening of the flow guide is placed radially just outside the driven shaft. For the axial closure of the driven shaft, a plug can preferably be used, far example, which plug can preferably be provided with recesses to introduce the oil transported via the flow guide into the passage in the driven shaft. It is also conceivable that the connection between the discharge area of the flow guide and the passage in the driven shaft could be realized in form of channels running radially.

In accordance with a preferred embodiment of the present invention, it can be advantageous to provide a seal between the mouth of the flow guide and a space between the piston and the turbine wheel. This seal can make it possible essentially to prevent oil leaks which can occur at the turbine wheel and which leaks could adversely affect the inflow of the oil leaving the flow guide and entering the passage in the driven shaft.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious, one with respect to the other.

One aspect of the invention resides broadly in a hydrokinetic lockup torque converter, such as for a motor vehicle, the torque converter comprising: a power input shaft defining an axis of rotation and an axial direction parallel to the axis of rotation; a power output shaft; a converter housing, the converter housing having apparatus for being driven by the power input shaft; a turbine wheel being disposed within the converter housing; the turbine wheel having apparatus for being disposed on and for driving the power output shaft; a pump wheel being disposed adjacent the turbine wheel and having apparatus for being fastened to the converter housing; lockup clutch apparatus for coupling the turbine wheel to the converter housing; the lockup clutch apparatus having an engaged position wherein the turbine wheel is coupled to the converter housing; the lockup clutch apparatus having a disengaged position wherein the turbine wheel and the converter housing are uncoupled from one another; the lockup clutch apparatus comprising: a piston being disposed between the converter housing and the turbine wheel; the piston and the converter housing defining a first chamber therebetween; a second chamber having the pump wheel and the turbine wheel disposed therein; at least one friction lining being disposed between a portion of the converter housing and a portion of the piston; the at least one friction lining having apparatus for contacting the converter housing and the piston in the engaged position of the lockup clutch apparatus; passage apparatus for supplying and discharging converter fluid from the torque converter, the passage apparatus being disposed adjacent the power output shaft; flow guide apparatus for connecting the first chamber to the passage apparatus; apparatus for permitting flow of converter fluid from the second chamber into the first chamber in the engaged position of the lockup clutch apparatus; the apparatus for permitting flow being disposed substantially adjacent the at least one friction lining; and the first chamber extending substantially between the apparatus for permitting flow and the flow guide apparatus.

Another aspect of the invention resides broadly in a hydrokinetic lockup torque converter, such as for a motor vehicle, the torque converter comprising: a power input shaft defining an axis of rotation and an axial direction parallel to the axis of rotation; a power output shafts a converter housing, the converter housing having apparatus for being driven by the power input shaft; a turbine wheel being disposed within the converter housing; the turbine wheel having apparatus for being disposed on and for driving the power output shaft; a pump wheel being disposed adjacent the turbine wheel and having apparatus for being fastened to the converter housing; lockup clutch apparatus for coupling the turbine wheel to the converter housing; the lockup clutch apparatus having an engaged position wherein the turbine wheel is coupled to the converter housing; the lockup clutch apparatus having a disengaged position wherein the turbine wheel and the converter housing are uncoupled from one another; the lockup clutch apparatus comprising; a piston being disposed between the converter housing and the turbine wheel; the piston and the converter housing defining a first chamber there between; a second chamber having the pump wheel and the turbine wheel disposed therein; at least one friction lining being disposed between a portion of the converter housing and a portion of the piston; the at least one friction lining having apparatus for contacting the converter housing and the piston in the engaged position of the lockup clutch apparatus; passage apparatus for supplying and discharging converter fluid from the torque converter, the passage apparatus being disposed adjacent the power output shaft; flow guide apparatus for connecting the first chamber to the passage apparatus; apparatus for permitting flow of converter fluid from the second chamber into the first chamber in the engaged position of the lockup clutch apparatus; the apparatus for permitting flow being disposed in the vicinity of the at least one friction lining; and the first chamber extending substantially between the apparatus for permitting flow and the flow guide apparatus.

An additional aspect of the invention resides broadly in a method of operating a hydrokinetic lockup torque converter, such as for a motor vehicle, the torque converter comprising: a power input shaft defining an axis of rotation and an axial direction parallel to the axis of rotation; a power output shaft; a converter housing, the converter housing having means for being driven by the power input shaft; a turbine wheel being disposed within the converter housing; the turbine wheel having means for being disposed on and for driving the power output shaft; a pump wheel being disposed adjacent the turbine wheel and having means for being fastened to the converter housing; lockup clutch means for coupling the turbine wheel to the converter housing; the lockup clutch means having an engaged position wherein the turbine wheel is coupled to the converter housing; the lockup clutch means having a disengaged position wherein the turbine wheel and the converter housing are uncoupled from one another; the lockup clutch means comprising: a piston being disposed between the converter housing and the turbine wheel; the piston and the converter housing defining a first chamber therebetween; a second chamber having the pump wheel and the turbine wheel disposed therein; at least one friction lining being disposed between a portion of the converter housing and a portion of the piston; the at least one friction lining having means for contacting the converter housing and the piston in the engaged position of the lockup clutch means; passage means for supplying and discharging converter fluid to and from the torque converter, the passage means being disposed adjacent the power output shaft; flow guide means for connecting the first chamber to the passage means; means for permitting flow of converter fluid from the second chamber into the first chamber in the engaged position of the lockup clutch means; the means for permitting flow being disposed in the vicinity of the at least one friction lining; and the first chamber extending Substantially between the means for permitting flow and the flow guide means; the method comprising the steps of: providing a power input shaft defining an axis of rotation and an axial direction parallel to the axis of rotation; providing a power output shaft; providing a converter housing, the converter housing having means for being driven by the power input shaft; providing a turbine wheel, the turbine wheel having means for being disposed on and for driving the power output shaft; providing a pump wheel, the pump wheel having means for being fastened to the converter housing; providing lockup clutch means for coupling the turbine wheel to the converter housing, the lockup clutch means having an engaged position wherein the turbine wheel is coupled to the converter housing, and a disengaged position wherein the turbine wheel and the converter housing are uncoupled from one another; the step of providing the lockup clutch means further comprises: providing a piston, the piston and the converter housing defining a first chamber therebetween; providing a second chamber; providing at least one friction lining, the at least one friction lining having means for contacting the converter housing and the piston in the engaged position of the lockup clutch means; providing passage means for transporting converter fluid to and from the torque converter; providing flow guide means for connecting the first chamber to the passage means; providing means for permitting flow of converter fluid from the second chamber into the first chamber in the engage a position of the lockup clutch means; the method further comprising the steps of disposing the turbine wheel within the converter housing and disposing the turbine wheel on the power output shaft with the means for being disposed on and for driving of the turbine wheel; disposing the pump wheel adjacent the turbine wheel; disposing the piston between the converter housing and the turbine wheel; disposing the pump wheel and the turbine wheel within the second chamber; disposing the at least one friction lining between a portion of the converter housing and a portion of the piston a disposing the passage means adjacent the power output shaft connecting the first chamber to the passage means with the flow guide means; disposing the means for permitting in the vicinity of the at least one friction lining; configuring the first chamber to extend substantially between the means for permitting and the flow guide means; driving the converter housing with the power input shaft with the means for being driven of the converter housing; transporting converter fluid to the torque converter and transporting converter fluid from the torque converter with the passage means; driving the power output shaft with the means for being disposed on and for driving of the turbine wheel; engaging and disengaging the turbine wheel and the converter housing with the lockup clutch means; contacting the piston and the converter housing in the engaged position of the lockup clutch means with the means for contacting of the at least one friction lining; and permitting converter fluid to flow from the second chamber into the first chamber in the engaged position of the lockup clutch means.

BRIEF DESCRIPTION OF THE DRAWINGS

Embodiments of the present invention are explained below in greater detail end are illustrated in the accompanying drawings, in which:

FIG. 1 shows the upper half of a longitudinal section through a torque converter with a lock-up clutch and flow passages in the form of holes which run radially inside the lock-up clutch to the axis of rotation, which holes empty at an axial distance from a driven shaft;

FIG. 1a a shows a schematic diagram of a multi-way valve and a pump;

FIG. 1b shows substantially the same view as FIG. 1, but shows additional components;

FIG. 1c shows a schematic diagram of the multi-way valve in reverse from the position shown in FIG. 1a;

FIG. 9a shows substantially the same view as FIG. 8, but has additional components labelled;

DESCRIPTION OF THE PREFERRED EMBODIMENT

Figure 2:
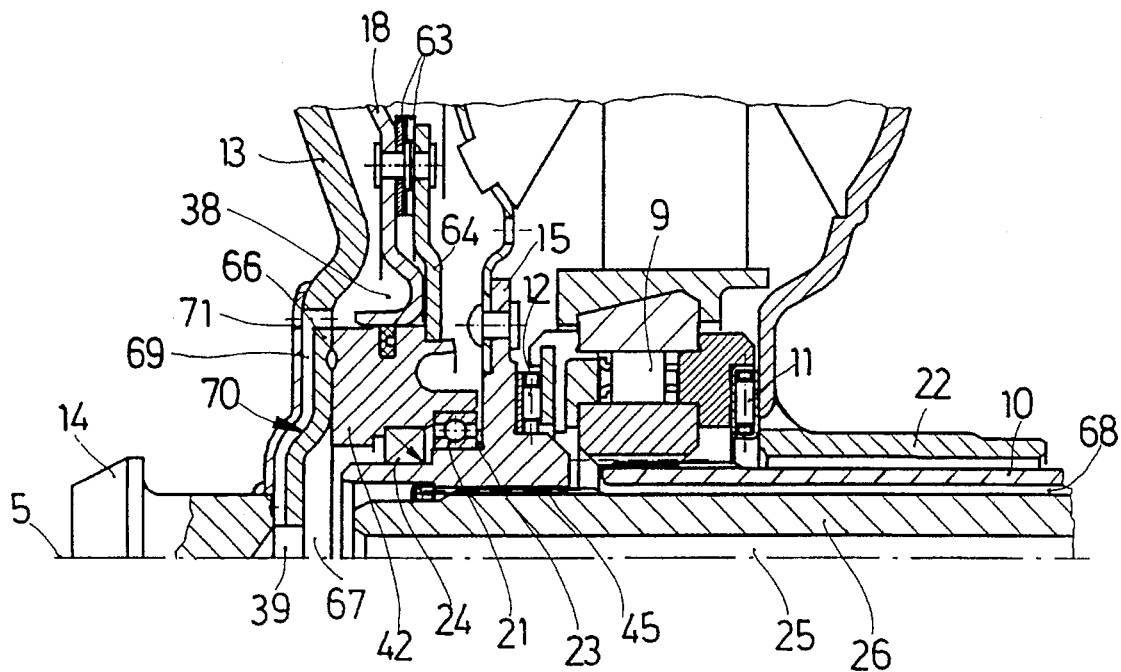
FIG. 2 shows a segment of a torque converter of a similar design, but with flow guides in the form of channels.

FIG. 1 shows a hydrokinetic torque converter 1 which generally includes a converter housing 13, the output side of which housing 13 can preferably be designed as a pump wheel 6 which empties into a tube 22. The tube 22 can preferably be mounted in a transmission (not shown), where it drives a pump P (see FIGS. 1a and 1b) to feed the torque converter 1 with hydraulic fluid, preferably oil. The converter housing 13 can preferably enclose a lock-up clutch 16, which lock-up clutch 16 preferably includes a piston 18. The piston 18 can preferably be designed on its external circumference with a radial area 19 which can preferably extend in a parallel direction with respect to a radial area 20 of the converter housing 13. Between the converter housing 13 and the piston 18 there can preferably be a plate 44, which plate 44 can preferably have friction linings 60 on both sides thereof. The plate 44 can be brought into frictional contact, via the linings 60, with the areas 19 and 20 of the converter elements 18, 13, respectively. The areas 19 and 20, as shown in more detail in FIG. 14, can preferably be designed with channels 62 on each of their sides facing a friction lining 60.

The plate 44 can preferably extend radially outward beyond the piston 18, and in its radially outer region, the plate 44 can preferably be connected by means of a connecting flange 7a', to an outer shell 7a (see FIG. 1b) of a turbine wheel 7 in a substantially non-rotational, but axially movable manner. In accordance with one preferred embodiment of the present invention, the connecting flange 7a' can be connected to the shell 7a by means of a weld 7b (see FIG. 1b). The piston 18 can also preferably be mounted in a non-rotational but axially movable manner on a bearing ring 42. The bearing ring 42 can preferably be integral with a bearing neck 14, which bearing neck 14 can be guided in a crankshaft (not shown) of an internal combustion engine, and can preferably be fastened to the converter housing 13, for example by means of a weld 13a (see FIG. 1b). The piston 18 can preferably be connected by means of leaf springs 63 to a ring plate 64, which ring plate 64 can be connected on its edges with the bearing ring 42. In accordance with one embodiment of the present invention, the ring plate 64 can preferably be connected to a flanged portion 42a (see FIG. 1b) of the bearing ring 42, possibly by a force fit or a weld (not shown). Preferably by means of the leaf springs 63, a bias of the piston 18 toward the converter housing 13 can be created.

The bearing ring 42 can preferably be located, on its end pointing away from the internal combustion engine, on a turbine hub 15 of the turbine wheel 7 by means of a bearing 21. The bearing ring 42 can preferably be sealed against the turbine hub 15 by means of a seal 24. The seal 24 can prevent a discharge of oil from a chamber A. This chamber A can preferably be formed by the turbine wheel 7 and the piston 18. The turbine hub 15 can preferably be mounted directly, by means of gear teeth 45, on a transmission-side output shaft 26. The output shaft 26 preferably extends toward the internal combustion engine to the vicinity of the bearing neck 14, and can preferably have a passage 25 in the form of a longitudinal hole. The passage 25 preferably empties on the driven side in the transmission and on the driving side in a space 67, which space 67 can preferably be located within the bearing neck 14.

The tube 22, in accordance with one embodiment, can preferably lead to the drive of the pump P (see FIG. 1a), and can be substantially concentric to the driven shaft 26. Located in a radial space between the tube 22 and the driven shaft 26 there can preferably be a support shaft 10, which support shaft 10 can have a freewheel 9 for a stator 8. In accordance with one embodiment of the present invention, the tube 22 can preferably be disposed about the driven shaft 26. The stator 8 can preferably be supported on both sides in the axial direction by bearing elements 11 and 12, on one hand with respect to the converter housing 13, and on the other hand with respect to the turbine hub 15, respectively. Essentially all of the rotating parts of the hydrodynamic torque converter are oriented concentric to a hub axis 5. In the bearing neck 14, starting from the driven shaft 26, there can preferably be a blind hole 39 of the space 67, from which blind hole 39 several holes 37 can preferably extend in a substantially diagonal manner, and in a radially outward direction. The holes 37 can preferably extend into a chamber 38, which chamber 38 can preferably be formed between the piston 18 and the converter housing 13.

The space A of the converter circuit can preferably be connected to the pump P (see FIG. 1a) by means of a space 68, which space 68 is preferably enclosed by the support shaft 10. The space 68 can preferably lead from the pump P via the spaces in the bearing element 12 into the pump wheel 6. A multi-way valve 27 (see FIG. 1a) is thereby located between the longitudinal hole 25 and the space 68 and between the pump P and a reservoir 47 for converter fluid respectively.

In accordance with one embodiment of the present invention, the converter can preferably function as follows:

In the illustrated position (see FIG. 1a) of the multi-way valve 27, the fluid current can preferably be transported from the reservoir 47 to the pump p essentially directly into the space 68, whereby the fluid can then flow into the space A. Consequently, on the side of the piston 18 facing away from the converter housing 13 there can preferably be an overpressure $P_1$ (see FIG. 1b) which displaces the piston 18 toward the internal combustion engine, and thus preferably brings the piston 18 into contact, by means of the friction linings 60 and plate 44, with the converter housing 13. As a result of the friction between the piston 18 and the converter housing 13 with the corresponding friction lining 60, there can preferably be a non-rotational connection between the piston 18 and the housing 13. As such, a torque can be transmitted from the converter housing 13, which converter housing 13 is preferably turning with the engine, and the piston 18 via the plate 44 to the turbine wheel 7, and, via the gear teeth 45 of the turbine hub 15, essentially directly to the driven shaft 26. The torque-is thus transmitted directly, preferably bypassing the converter circuit.

In accordance with one embodiment of the present invention, at least a portion of the converter fluid from the space 68 can preferably enter space A through a hole 12a (see FIG. 1b) in the wall 7a of the turbine wheel 7.

Figure 14:
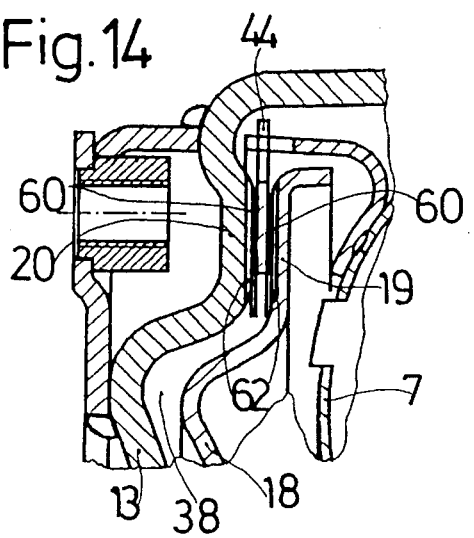
FIG. 14 shows the piston of the lock-up clutch and the converter housing with radial channels on the side of the converter housing facing a plate, which plate has friction linings on both sides.

A portion of the oil pressed by the piston 18 against the converter housing 13 preferably travels radially outward into the vicinity of the plate 44, where under the action of the differential pressure from the chamber 38, the oil can flow radially inward through the channels 62 (see FIG. 14). In other words, and in accordance with one embodiment of the present invention, as the piston 18 presses against the housing 13, a portion of the oil can preferably be forced radially outward in essentially all directions with respect to the plate 44. Then, because of the lower pressure in chamber 38, the oil can then preferably move into chamber 38 via the channels 62, and radially towards the axis 5. In accordance with the embodiment of the present invention shown in FIG. 14, the channels 62 can preferably be located in the areas 19 and 20 of the piston 18 and the housing 13, respectively. Consequently, the friction linings 60, but primarily the areas 19 and 20 of the piston 18 and the converter housing 13 can preferably be cooled, which can be particularly important when the lock-up clutch 16 is operated with slip.

After the oil flows through the channels 62, it arrives in the chamber 38 where, flowing through the chamber 38, it can also cool the areas of the piston 18 and the converter housing 13 which are more radially inward, preferably before the oil travels through the holes 37 into the blind hole 39 of the space 67. During rotation of the converter housing 13 around the converter axis 5, without special precautions, a Coriolis force could develop possibly leading to an oil vortex. Therefore, the holes 37 can preferably be configured to counteract against the effect of the Coriolis force, so that the individual oil particles can essentially maintain a radially inward flow direction. The present invention teaches that the holes 37 are thereby continued radially inward until they empty radially inside a zone in which, if the oil particles were not supported against the coriolis force, a vortex would most likely form, the diameter of which vortex would typically be a function of the angular velocity of the converter housing 13 and of the radial velocity of the oil. Further, the vortex, preferably in the entry area of the longitudinal hole 25 of the driven shaft 26, would typically lead to a significant reduction in the cross section of the oil current, which would most likely in turn interfere with the discharge of the oil into the reservoir 47, in which reservoir 47 the oil can preferably be cooled. A significant drop in pressure in the entry area of the oil into the longitudinal hole 25 would occur in the chamber 38, and would reduce the level of torque which can be transmitted.

Thus, in accordance with one embodiment of the present invention, converter fluid from the converter circuit can preferably be introduced into chamber 38 via the channels 62, preferably when the piston 18 of the lockup clutch 16 is in an engaged position with the converter housing 13. It should be understood that the converter fluid which enters the chamber 38 during engagement of the lockup clutch 16 can preferably not interfere with the overpressure $P_1$ which occurs in space A during engagement of the lockup clutch 16. Further, the converter fluid can be introduced into the channels 62 at a distance of about 12.5 cm from the converter axis 5. Of course, these dimensions are given only by way of example and variations are therefore within the scope of the present invention.

On account of the holes 37 which preferably act as flow guide 70 and extend into the zone wherein a vortex could form, the oil particles are no longer held in the circumferential direction only when they are so close to the axis 5 of the converter that significant forces in the circumferential direction are no longer acting on them. They can then be introduced into the longitudinal hole 25 in the driven shaft 26 essentially without any restriction.

In the second possible position of the multi-way valve 27 shown in FIG. 1c, the pump P can preferably be connected to the longitudinal hole 25 and the return can be connected to the space 68. In this case, the full pressure of the fluid is transported into the space 67 and via this space 67 and the holes 37 into the chamber 38, as a result of which the piston 18 is displaced to the right and loses its torque-transmission function. In other words and in accordance with one embodiment of the present invention, the converter fluid can be pumped into the pump P from the reservoir 47, through longitudinal hole 25 in the driven shaft 26, into the space 67 and blind hole 39, and into the holes 37. Thus, the converter fluid, now moving in the opposite direction from that described above, can preferably serve to cool the friction lining or linings 60 in the opposite direction. Further, once the piston 18 moves away from the converter housing 13, the turbine wheel 7 can preferably be disconnected from the housing 13, and will therefore stop moving at the same speed as the housing 13.

Figure 2A:
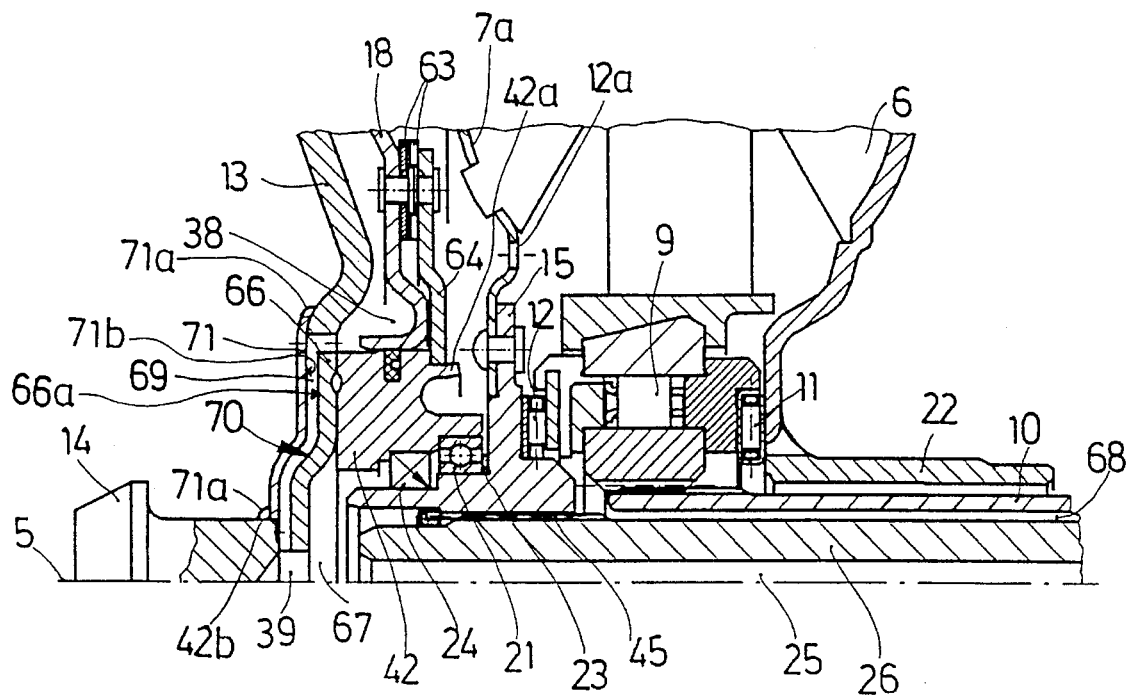
FIG. 2a shows substantially the same view as FIG. 2, but has additional components labelled.

The torque converter illustrated in FIGS. 2 and 2a is substantially similar to the one illustrated in FIGS. 1 and 1b, with the exception of the area illustrated in detail. The ring plate 64 is preferably connected to the piston 18 by means of leaf springs 63, and can also be connected by its edges to the bearing ring 42. The bearing ring 42 can preferably be connected to a flange-like expanded portion 66 of the bearing neck 14, which flange-like portion 66 can preferably extend radially outward, with respect to axis 5. In accordance with one preferred embodiment, the bearing ring 42 can be connected to the portion 66 by a weld 42b (see FIG. 2a). Axially outside the expanded portion 66, there can preferably be channels 69, which channels 69 can preferably be covered by a cover plate 71. The sorer plate 71 can preferably be fastened on one end to the converter housing 13 and on the other end of the bearing neck 14, preferably by means of welds 71a. The channels 69 can preferably act as flow guide 70, which flow guide 70 empties with its end facing the converter axis 5 into the blind hole 39.

To summarize, and in accordance with this embodiment, oil which has flowed through the chamber 38 can preferably be transported via the channels 69 and the blind hole 39 of the space 67 into the longitudinal hole 25 of the driven shaft 26, and thus arrives in the reservoir 47.

In accordance with one embodiment of the present invention, cover plate 71 can preferably have portions which extend axially from an interior surface 71b (see FIG. 2a) of cover plate 71 to an exterior surface 66a of flange-like portion 66. These axial portions can preferably serve to create a plurality of separate channels 69 for directing the flow of oil. Alternatively, the flange-like portion 66 can have axial portions which extend from the surface 66a of the portion 66 to the interior surface 71b of cover plate 71. In accordance with yet an additional embodiment, the flow guide 70 can be one continuous channel 69.

Figure 3:
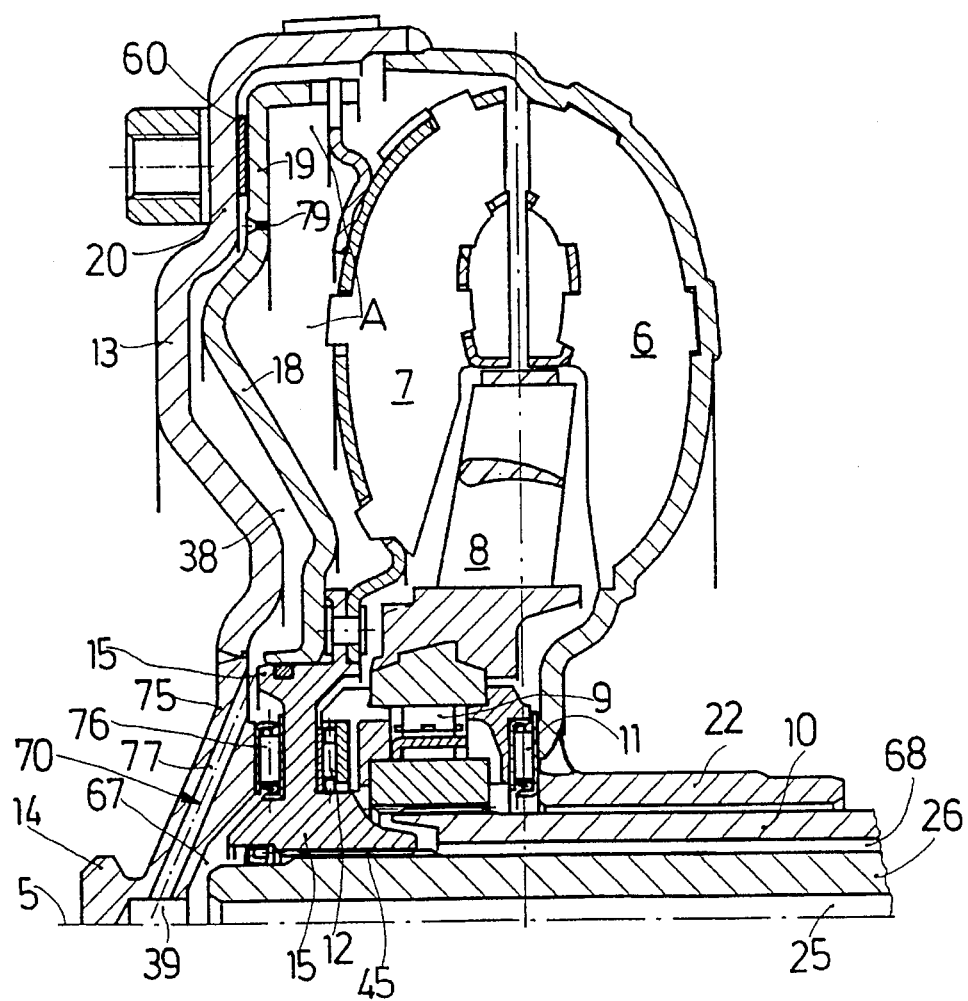
FIG. 3 shows the upper half of a longitudinal section through a torque converter with a different type of bearing of the piston of a look-up clutch and with flow guides as shown in FIGS. 1 and 1b.
Figure 3A:
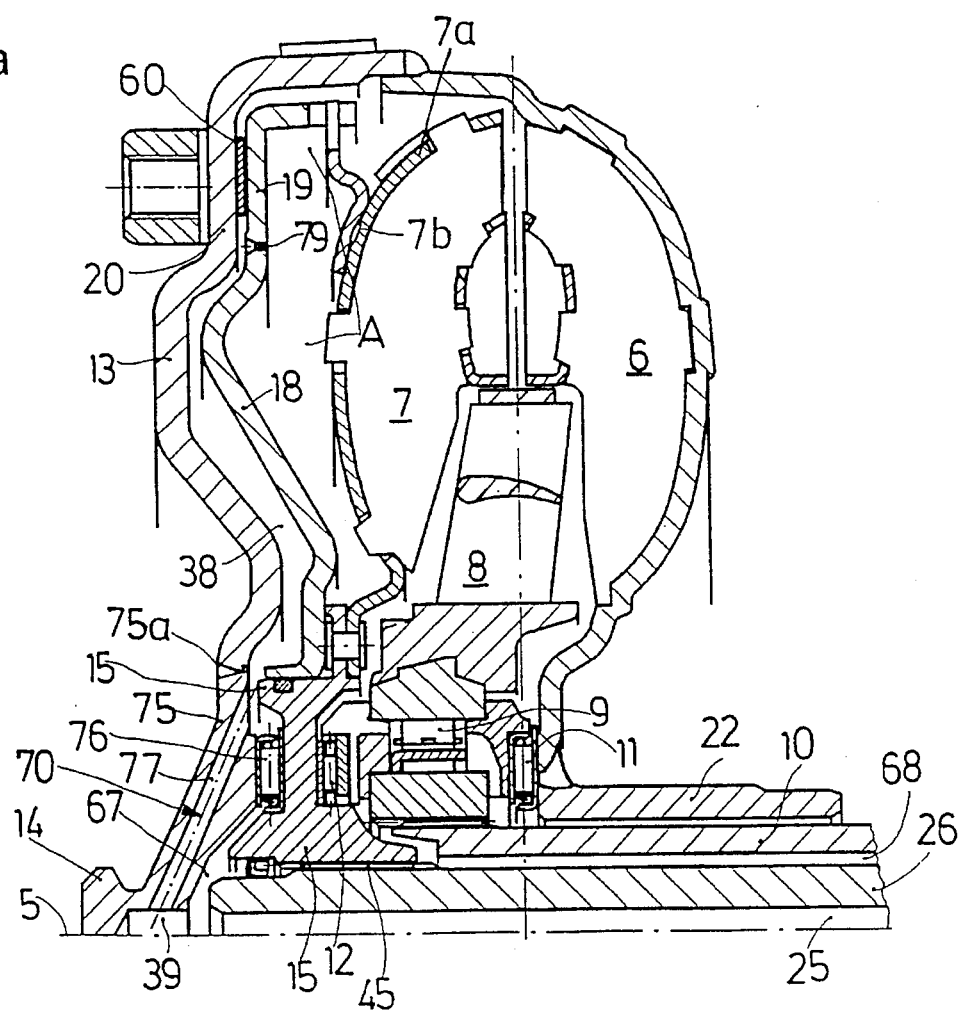
FIG. 3a shows substantially the same view as FIG. 3, but has additional components labelled.

FIGS. 3 and 3*a* show a torque converter which differs from FIGS. 1, 1*b*, 2 and 2*a* in that the piston 18 can preferably be located on the turbine hub 15 non-rotationally, but so that it can move axially, instead of on the bearing ring 42 as shown in FIGS. 1, 1*b*, 2 and 2*a*. The turbine hub 15 can preferably be secured axially between the bearing element 12 and an axial bearing 76. The bearing 76 can preferably be held in an expanded portion 75 of the bearing neck 14, which expanded portion preferably extends radially outward in the manner of a flange. In the expanded portion 75, a hole 77 acting as a flow guide 70 runs diagonally radially outward, and empties on one end in the chamber 38 and on the other end in the blind hole 39 of the space 67. Further, in accordance with one embodiment of the present invention, the expanded portion 75 can preferably be connected to housing 13 by means of a weld 75*a*. (see FIG. 3*a*)

Figure 15:
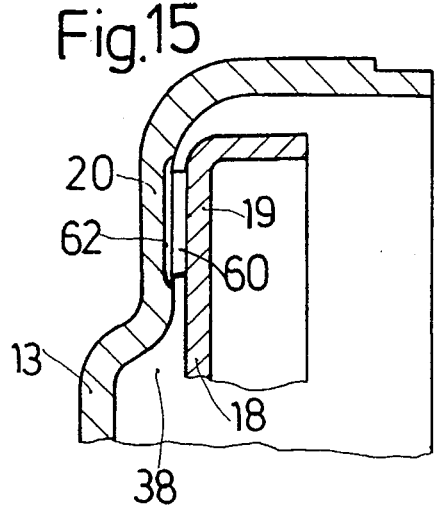
FIG. 15 shows the piston of the lock-up clutch and the converter housing of a design similar to that illustrated in FIG. 14, but with channels only on the converter housing and a friction lining on the piston, without the interposition of a plate.

The piston 18 can preferably be provided on its radial area 19 with a friction lining 60 which can be brought into contact with the area 20 of the converter housing 13. The area 20, as shown in more detail in FIG. 15, can preferably be designed with channels 62 in the area over which the friction lining 60 extends. Radially inside the friction lining 60, the piston 18 can preferably be provided with openings 79, which openings 79 have a very small diameter.

A portion of the oil which generates the application force of the piston 18 against the converter housing 13 can preferably flow through the openings 79 and can thereby arrive radially just inside the friction lining 60 in the chamber 38, where as it flows, it cools both the piston 18 and the converter housing 13 radially inside the friction lining 60. Consequently, the heat generated in the area covered by the friction lining 60 can be discharged radially inwardly relatively quickly. The oil leaves the chamber 38, enters the holes 77 and, after passing through the blind hole 39 of the space 67, can preferably reach the longitudinal hole 25 in the driven shaft 26.

Further, and in accordance with one embodiment of the present invention, the converter fluid which is forced between areas 19 and 20 can be directed through the channels 62 (see FIG. 15) and can thus serve to cool the friction lining 60 and can also serve to cool the area 20 of the housing 13, as described above with regard to the embodiments shown in FIGS. 1, 1*b*, 2 and 2*a*.

In accordance with one embodiment of the present invention, the converter fluid can preferably be introduced from the converter circuit into channels 62 at a distance of about 13 cm from the converter axis 5. Further, the portion of the converter fluid which enters the openings 79 can preferably enter the openings 79 at about 11 cm from the converter axis. Of course, these dimensions are given only by way of example and variations are therefore within the scope of the present invention.

Figure 4:
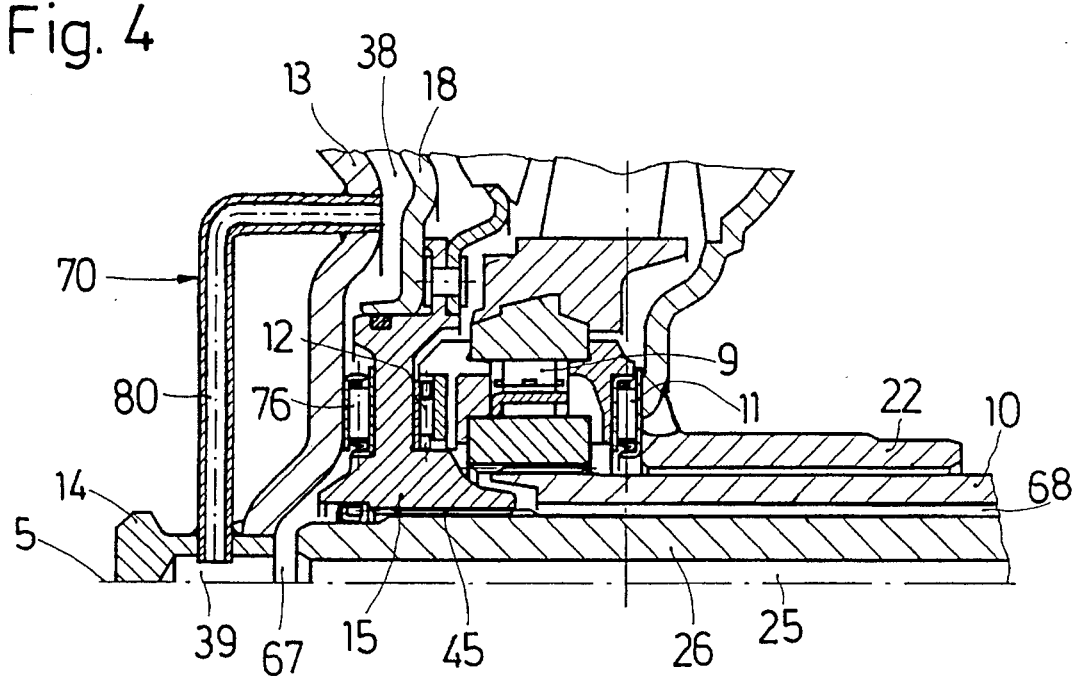
FIG. 4 shows a segment of a torque converter of a design similar to the one illustrated in FIGS. 3 and 3a, but with a tubular flow guide.
Figure 4A:
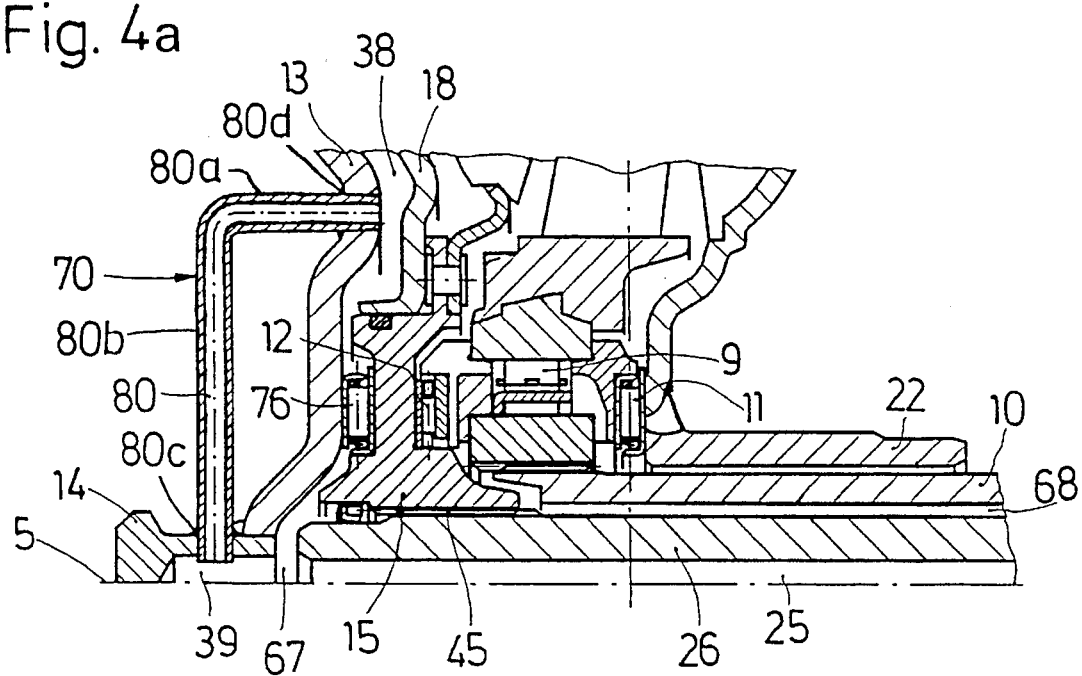
FIG. 4a shows substantially the same view as FIG. 4, but has additional components labelled.

The torque converter illustrated in FIGS. 4 and 4*a* is substantially the same as the one illustrated in FIGS. 3 and 3*a*, with the exception of the portion illustrated in detail. In contrast to the embodiment illustrated in FIGS. 3 and 3*a*, a tube 80, which tube 80 preferably acts as the flow guide 70, penetrates the wall of the converter housing 13, preferably at a point which is selected so that the tube 80 forms a connection to the chamber 38 in a radially inner portion of the chamber 38. The tube 80 can be bent towards the converter housing 13 to form a first portion 80*a* and a second portion 80*b* (see FIG. 4*a*. The first portion 80*a* can preferably extend in the axial direction, and the second portion 80*b* can preferably extend an the radial direction towards the axis 5 and can preferably empty essentially directly into the blind hole 39 of the space 67. Oil which has left the chamber 38 can preferably travel through the tube 80 and, via the space 67, can preferably travel into the longitudinal hole 25 of the drive shaft 26. In accordance with one embodiment of the present invention, one end of the tube 80 can preferably be appropriately connected to bearing neck 14, such as by a weld 80*c*, and the other end of the tube 80 can preferably be connected to the housing 13, also by a weld 80*d*. Of course, other types of fastenings are within the scope of the present invention.

Figure 5:
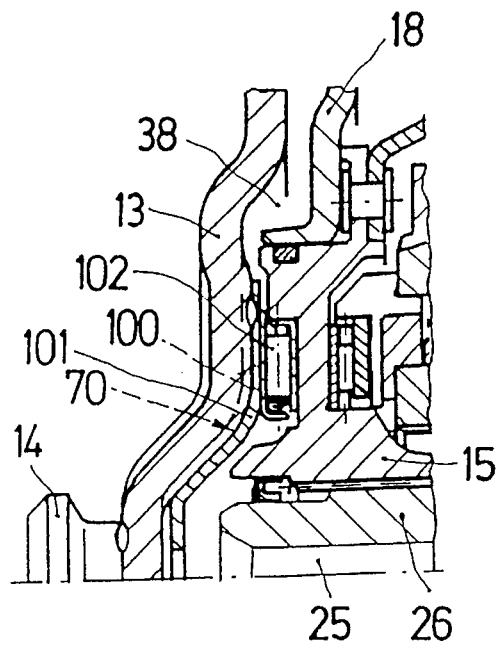
FIG. 5 shows a segment of a torque converter of a design similar to the one illustrated in FIGS. 2 and 2a, but with a flow guide of a different design.

FIGS. 5 to 13 show additional flow guides 70 with various types of feeds into the longitudinal hole 25 of the driven shaft 26. In each of the embodiments shown in FIGS. 5–13, the piston 18 is preferably attached to the turbine hub 15, similar to the embodiments shown in FIGS. 3, 3*a*, 4 and 4*a*. One such feed is shown in FIG. 5.

Figure 6:
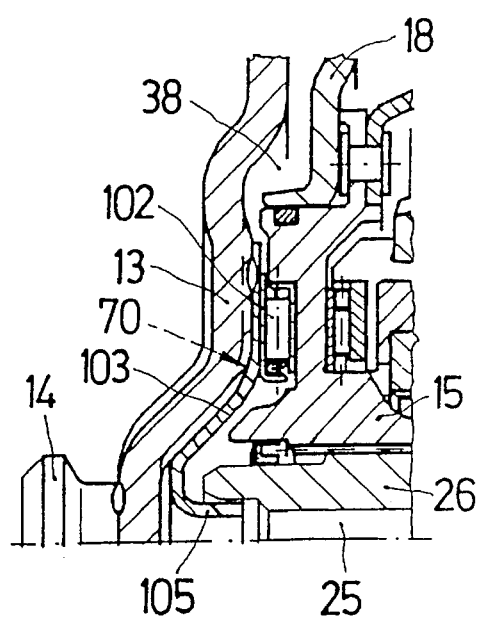
FIG. 6 shows a segment of a torque converter of a design similar to the one illustrated in FIGS. 2 and 2a, but with an inlet nozzle on the flow guide pointing toward the driven shaft.
Figure 6A:
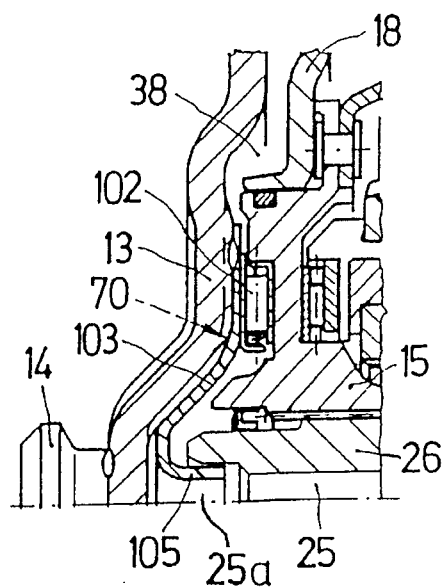
FIG. 6a shows substantially the same view as FIG. 6, but has additional components labelled.

In accordance with the embodiment shown in FIG. 5, the wall of the converter housing 13 can preferably have channels 100, which channels 100 preferably extend essentially radially. The channels 100 can preferably be formed by stamping or machining, and can preferably be covered by a cover plate 101, the shape of which cover plate 101 preferably matches or follows the shape of the converter housing 13. The channels 100, which can preferably act as the flow guide 70, can also run radially inward, and end in the vicinity of the diameter of the longitudinal hole 25 of the driven shaft 26. The penetration of oil coming directly towards hole 25, from the chamber 38 between the cover plate 101 and the turbine hub 15, can preferably be prevented by a quasi-tight bearing 102. The cover plate 101, with its radially inner end, can preferably be disposed at a close or tight axial distance from the driven shaft 26. In contrast to the embodiment shown in FIG. 5, a comparable cover plate 103 is illustrated in FIG. 6. The cover plate 103 can preferably have a nozzle-shaped inlet 105. The cover plate 101 can then preferably extend into a hole 25*a* or passage (see FIG. 6*a*) of the driven shaft 26, thereby feeding directly into hole 25 via hole or passage 25*a*.

Figure 7:
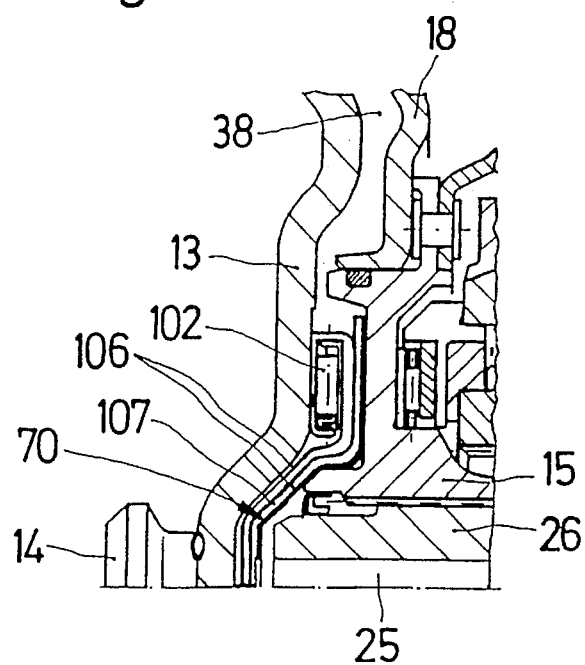
FIG. 7 shows a segment of a torque converter of a design similar to the one illustrated in FIGS. 2 and 2a, but with a flow guide of a different design.

An additional embodiment is shown in FIG. 7, wherein the quasi-pressure-tight bearing 102 is preferably disposed between the converter housing 13 and two baffles or guide plates 106, which guide plates 106 are preferably in contact with one another. In one of these two guide plates 106, there can preferably be groove-shaped channels 107, each of which channel 107 is preferably closed by the other guide plate 106. The channels 107 can preferably act as the flow guide 70 and can empty, as in the embodiment illustrated in FIG. 5, radially in the vicinity of the diameter or circumference of the longitudinal hole 25 of the driven shaft 26, at some axial distance from the latter. In accordance with one embodiment of the present invention, this axial distance can preferably be a short axial distance.

Figure 8A:
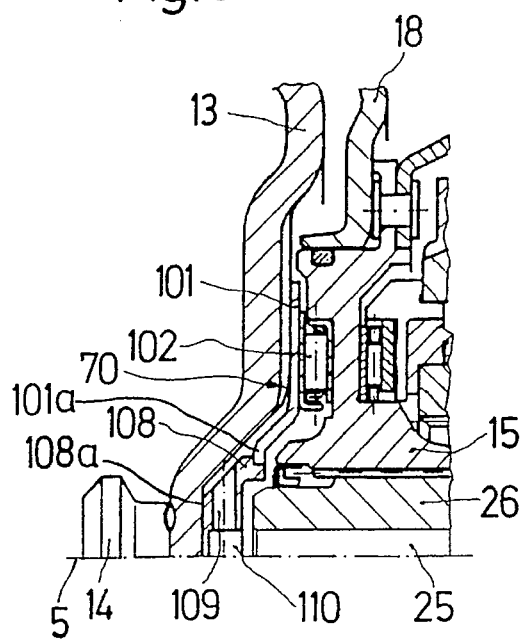
FIG. 8 shows a segment of a torque converter similar to the one illustrated in FIG. 5, but with an extension for the flow guide extending almost to the axis of rotation, with axial feed to a passage in the driven shaft.
Figure 19A:
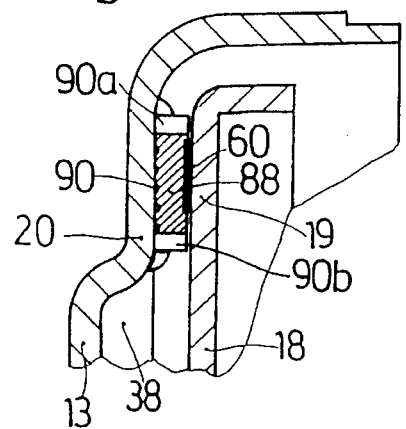
FIG. 19a shows substantially the same view as FIG. 19, but has additional components labelled.
Figure 8:
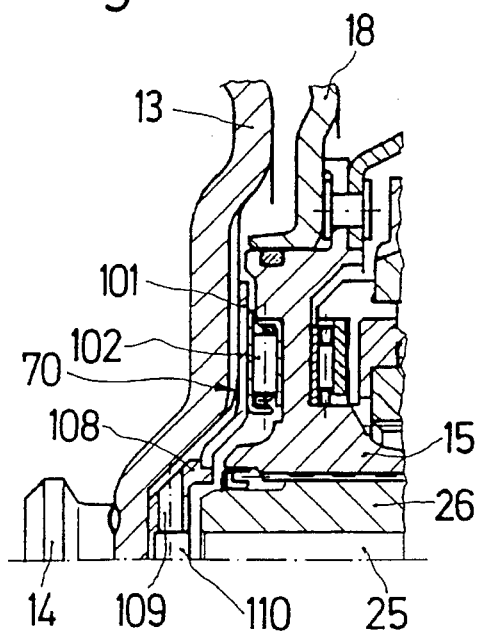

An additional flow guide is illustrated in FIGS. 8 and 8*a*, and is substantially the same as the one illustrated in FIG. 5, with the exception of its radially inner area 101*a* (see FIG. 8*a*). The inner end or area 101*a* of the cover plate 101 can preferably be non-rotationally connected to a closure 108, which closure 108 can preferably be in contact with the converter housing 13 on a side 108*a* (see FIG. 8*a*) of the closure 108 which faces away from the driven shaft 26. The closure 108 can preferably have at least one hole 109, which hole 109 preferably extends radially to the converter axis 5, and can act as part of the flow guide 70. The hole 109 can preferably be provided on its side facing the driven shaft 26 with an opening 110 which is substantially aligned with the longitudinal hole 25 of the driven shaft 26.

Figure 9:
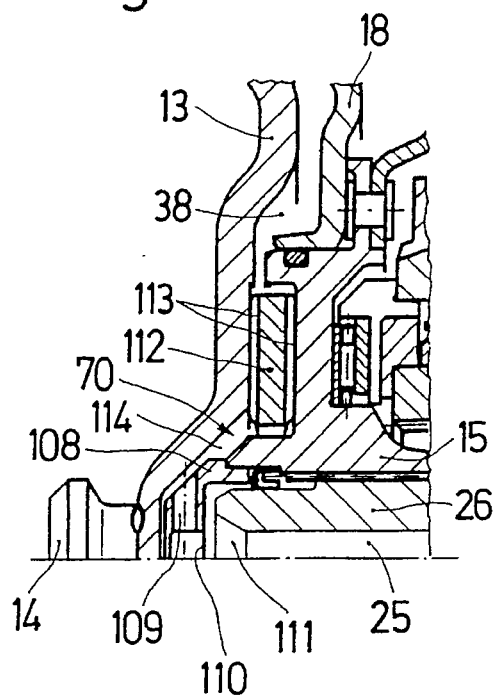
FIG. 9 shows a segment of a torque converter of a design similar to the one shown in FIGS. 8 and 8a, but with a multi-channel flow guide.

FIG. 9 shows an additional closure 108 similar to that shown in FIGS. 8 and 8a, which closure can preferably be designed with at least one hole 109, which hole 109 preferably extends radially. In contrast to the closure 108 illustrated in FIGS. 8 and 8a, the closure 108 illustrated in FIG. 9 can preferably be non-rotationally connected to the turbine hub and can interact, via hole 109, with an opening 111 in the driven shaft 26, which opening 111 can act as an inlet funnel for the oil into the longitudinal hole 25.

Further, as also shown in FIG. 9, located radially between the closure 108 and the chamber 38 there can preferably be a disc 112, which disc 112 can be designed, both on its side facing the converter housing 13 and also on its side facing the turbine hub 15, with channels 113. The channels 113, in connection with a diagonal channel 114 leading to the hole 109 of the closure 108, can preferably form the flow guide 70.

Figure 10:
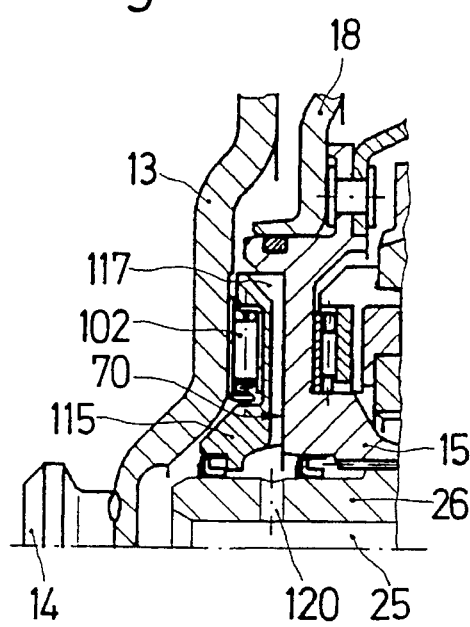
FIG. 10 shows a segment of a torque converter of a design similar to the one shown in FIGS. 8 and 8a, but with the flow guide at a greater distance from the converter housing.

An additional embodiment is shown in FIG. 10, wherein there can preferably be a spacer 115 between the converter housing 13 and the turbine hub 15. The spacer 115 can preferably be sealed on its side facing the converter housing 13 by means of a quasi-tight bearing 102. The spacer 115 can have channels 117 on its side facing the turbine hub 15, which channels 117 preferably interact with an aligned opening 120 oriented radially in the driven shaft 26. The opening 120 can preferably lead to the longitudinal hole 25.

Figure 11:
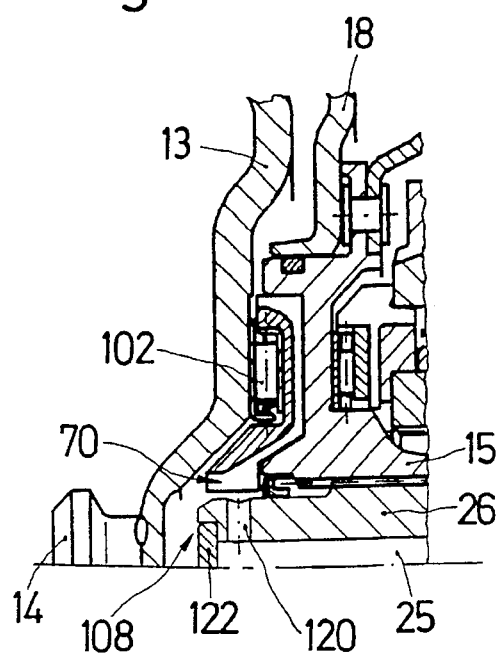
FIG. 11 shows a segment of a torque converter of a design similar to the one shown in FIG. 10, but with an axial closure of the driven shaft.

The embodiment illustrated in FIG. 11 is substantially the same as the embodiment illustrated in FIG. 10, with the exception that the driven shaft 26 can preferably be covered on its engine-side end with a closure 108 preferably in the form of a cover 122.

Figure 12:
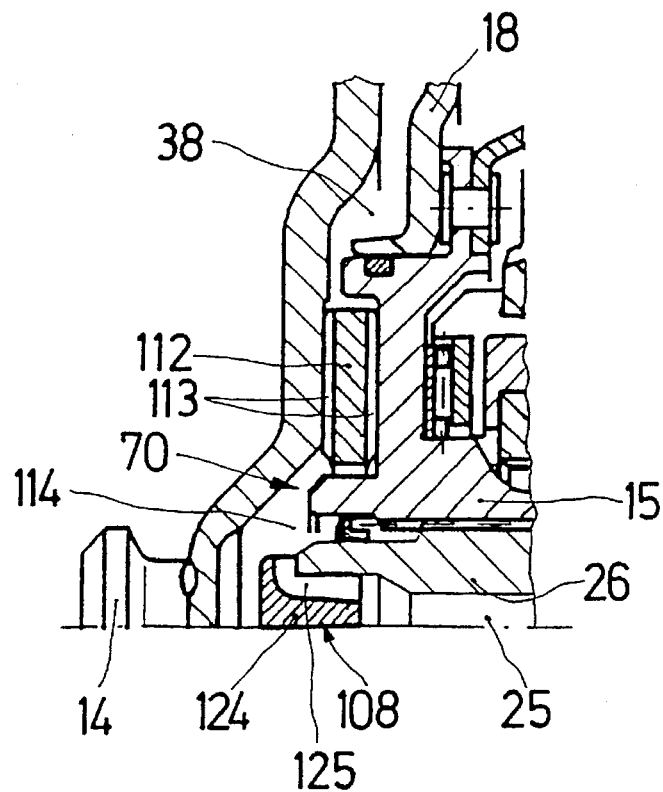
FIG. 12 shows a segment of a torque converter of a design similar to the one shown in FIG. 9, but with an axial closure of the driven shaft and recesses in the closure which guide the flow.

FIG. 12 illustrates an additional embodiment of the flow guide 70 in which, as in FIG. 9, there can preferably be a disc 112 located radially between the chamber 38 and the converter axis 5. The disc 112 can preferably be designed on either one or both of its opposite sides with channels 113, which channels 113 preferably empty into a common channel 114. The channel 114 can preferably lead to a plug 124 located on the driven shaft 26. The plug 124 can preferably act as a closure 108 on its axial end, and can be provided with recesses 125, which recesses 125 can form nozzle-shaped inlets which preferably lead into the longitudinal hole 25 of the driven shaft 26.

Figure 13:
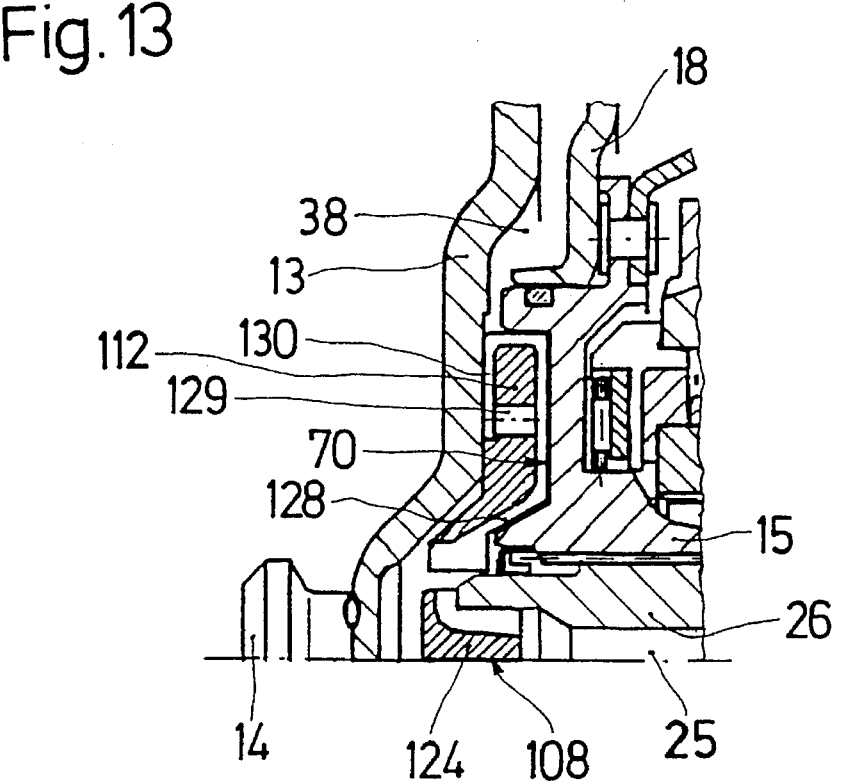
FIG. 13 shows a segment of a torque converter of a design similar to the one shown in FIG. 12, but with a single-channel flow guide.

The embodiment illustrated in FIG. 13 differs from the embodiment illustrated in FIG. 12 essentially in that there is a disc 112, which disc 112 can preferably be located radially between the chamber 38 and the plug 124, and which disc 112 has essentially only one channel 128 leading radially inward. The channel 128 can preferably be connected by means of a horizontal hole 129 in the radially outer area of the disc 112 to a second channel 130 which ends in the disc 112. In other words, and in accordance with one embodiment of the present invention, the channel 130 preferably does not extend along the entire extent of disc 112, as does channel 128.

it should be understood that the various embodiments of the flow guide 70 illustrated in FIGS. 5–13 can preferably have singular continuous channels, or alternatively, can have a plurality of separate and distinct channels.

Figure 16:
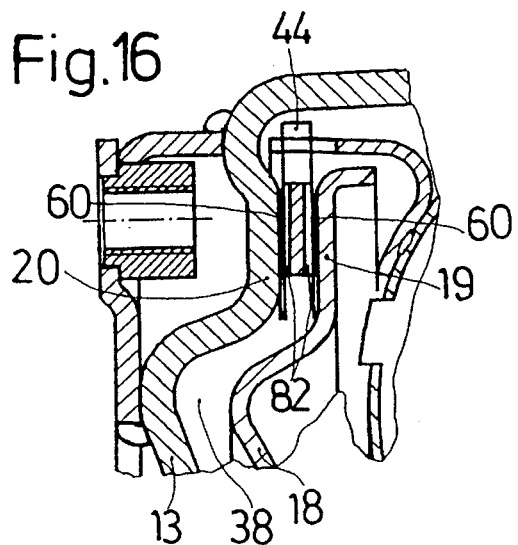
FIG. 16 shows the piston of the lock-up clutch and the converter housing of a design similar to that illustrated in FIG. 14, but with channels on both sides of the plate and friction linings on the piston and converter housing.

FIGS. 14 to 21 are enlarged illustrations of the area in which the piston 18 comes into contact with the converter housing 13. It should be noted that FIGS. 14 end 15 have already been discussed in relation to FIGS. 1, 1b, 3 and 3a. The embodiment illustrated in FIG. 16 is structurally similar to the embodiment illustrated in FIG. 14, with the exception that in this case, the areas 19 and 20 of the piston and converter housing 13 can preferably have smooth or flat surfaces, and can also have friction linings 60, while the plate 44 can preferably be designed on each of its sides facing the friction linings 60 with channels 82, which channels 82 preferably extend radially.

Figure 17:
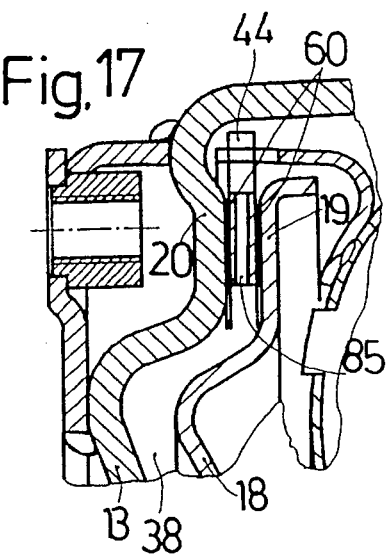
FIG. 17 shows the piston of the lock-up clutch and the converter housing of a design similar to that illustrated in FIG. 16, but with a channel in the center of the plate.

In the embodiment illustrated in FIG. 17, there can preferably be a friction lining 60 attached in each of the areas 19 of the piston 18 and the area 20 of the converter housing 13. The areas 19 and 20 of the piston 18 and the converter housing 13 can preferably be designed with smooth or flat surfaces. Between the areas 19 and 20 there can preferably be a plate 44, which plate 44 can also be designed with smooth or flat surfaces on its sides facing the friction linings 60. The plate 44 can preferably have a central channel 85, one end of which channel 85 can be connected to the space A of the converter circuit and the other end of which can empty into the chamber 38. Thus, the oil extracted from the converter circuit, after flowing through channel 85, preferably cools the plate 44 from the inside out, before arriving in the chamber 38.

Figure 18:
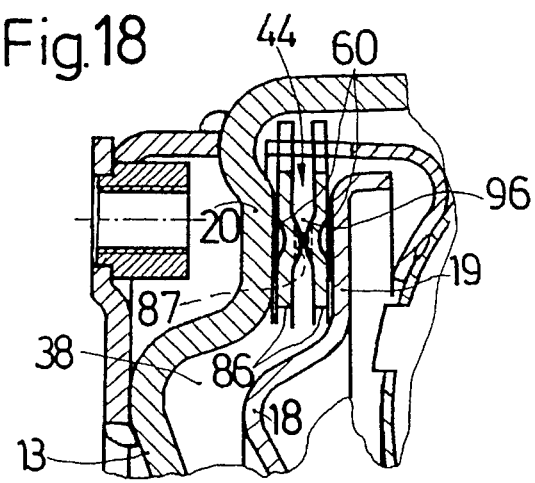
FIG. 18 shows the piston of the lock-up clutch and the converter housing of a design similar to that illustrated in FIG. 16, but with a specially-shaped plate.

FIG. 18 illustrates one particular embodiment of a plate 44, which plate 44 can preferably be shaped so that for the heat exchange between the friction linings 60, there can be two elements 86 which run essentially parallel to each other on their ends, and can preferably be curved toward one another in the center. A groove 96 can preferably be formed between the two elements 86, and the two elements can be spot-welded together near the portions of the two elements 86 which curve toward one another. The two elements 86 can preferably have radial channels 87 disposed between each of these weld spots. The plate 44 can also extend, as described above with reference to FIG. 17, into the converter circuit on one end and into the chamber 38 on the other end. In accordance with one embodiment of the present invention, one of the friction linings 60 can preferably be attached to the converter housing 13 and the other friction lining 60 can be attached to the piston 18.

Figure 19:
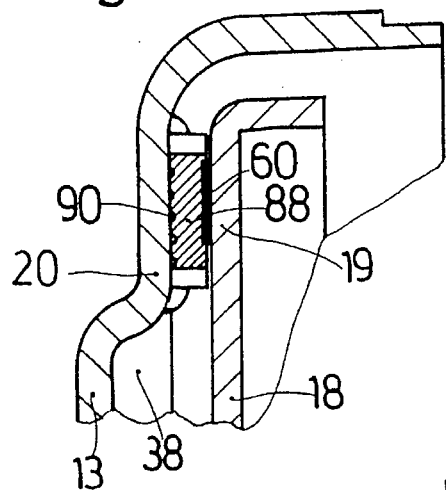
FIG. 19 shows the converter housing with a flow element with a spiral-shaped channel, in contact with the friction lining of the piston.
Figure 20:
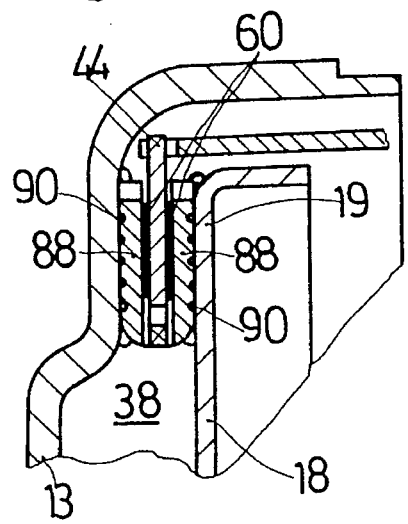
FIG. 20 shows an embodiment similar to that shown in FIGS. 19 and 19a, but with two flow elements, between which there is a plate, which two flow elements have friction linings facing the plate.

FIGS. 19 and 20 illustrate embodiments which each preferably hove at least one flow element 88, in which flow element 88 there can preferably be at least one channel 90. The channel 90 can preferably be in the form of an Archimedean spiral which can preferably be curved toward the diameter and can run from outside in.

In other words, and in accordance with one embodiment of the present invention, the flow element 88 can preferably have a channel or channels 90, which channel 90 can preferably have an outlet in the vicinity of the outer circumference of the flow element 88, and can also have an outlet in the vicinity of the inner circumference of the flow element 88. An opening 90a can preferably be disposed adjacent the outlet near the outer circumference, and another opening 90b can preferably be disposed adjacent the outlet near the inner circumference. Thus, oil can enter the outlet near the outer circumference via opening 90a, and can then flow around entire flow element 88, possibly a number of times, until the oil reaches the outlet near the inner circumference of flow element 88. Once the oil reaches the outlet near the inner circumference of flow element 88, the oil can flow into chamber 38, preferably via opening 90b.

Oil supplied from the converter circuit must accordingly pass through essentially the entire length of the channel 90 before it enters the chamber 38. On account of the relatively long distance travelled by the oil, an excellent heat exchange can preferably take place between the flow element 88 and the oil, so that a particularly effective cooling takes place. In accordance with one embodiment, the friction lining 60 shown in FIG. 19 can preferably be attached to the flow element 88, or, alternatively, the friction lining 60 could be attached to the piston 18. Essentially the only difference between FIGS. 19 and 20 is that in FIG. 19, the flow element 88 can preferably be fastened to the converter housing 13 and has the channel 90 on the side facing the converter housing 13, while its opposite side can preferably be in contact by means of a friction lining 60 with the piston 18. In contrast, in FIG. 20, there can preferably be two flow elements 88, one on each side of a plate 44, whereby the flow elements 88 can each be designed with a friction lining 60 on its side facing the plate 44, and each can preferably have a channel or channels 90 on its side facing away from the plate 44. Further, the flow elements 88, in accordance with one embodiment of the present invention can preferably be attached to one another on an end opposite to the plate 44.

Figure 21A:
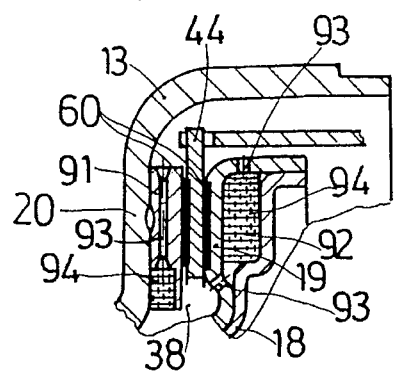
FIG. 21a shows substantially the same view as FIG. 21, but has additional components labelled.
Figure 21:
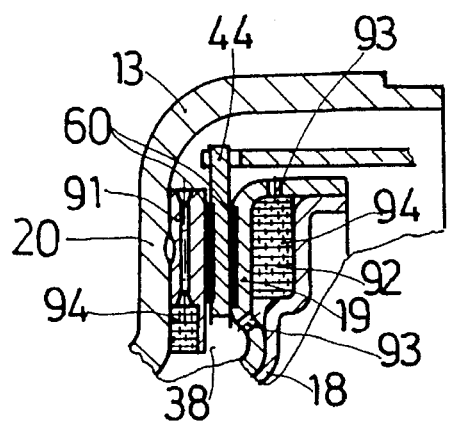
FIG. 21 shows an embodiment similar to that shown in FIG. 20, but with flow elements which each have an insert in a chamber.

FIGS. 21 and 21a illustrate an embodiment in which, between the converter housing 13 and a plate 44, which plate 44 preferably has a first friction lining 60, on the side facing the converter housing 13, there can preferably be a first flow element 91. Between the piston 18 and the side of the plate 44 facing it, which plate 44 can also have a second friction lining 60, there can preferably be a second flow element 92. In accordance with an alternative embodiment, one friction lining 60 can preferably be attached to flow element 91 and the other friction lining 60 can be attached to area 19.

The flow elements 91, 92 can each preferably have a channel 93 (see FIG. 21a), and each channel 93 can empty into a space which can preferably contain an insert 94. The insert 94 can preferably be formed by a braid made of sintered material or steel. The insert 94 can preferably cause a deceleration of the flowing oil, so that the oil remains in the area covered by the friction lining 60 for a longer period of time, thereby improving the heat exchange. These flow elements 91, 92 can also preferably be connected with the space A on the input side of the converter circuit and with the chamber 38 on the output side of the converter circuit.

In accordance with one embodiment of the present invention, area 19 can preferably be integral with the piston 18, or could be a separate piece which is preferably attached to the piston 18. Further, area 19 can have two channels 93, while flow element 91 can preferably have one channel 93. Still further, flow element 91 can preferably be appropriately fastened to area 20 of the housing 13, for example by welding, and flow element 92 can preferably be enclosed in a space preferably formed between area 19 and piston 18.

One feature of the invention resides broadly in the hydrodynamic torque converter consisting of a pump wheel driven by an internal combustion engine, a turbine wheel connected to a driven shaft, and a stator, which together form a converter circuit filled with hydraulic fluid, preferably oil, a lock-up clutch which comprises at least one piston which can be connected by means of at least one friction lining to the converter housing and which with the converter housing defines a chamber, whereby the chamber is connected by at least one flow guide which is essentially radial to a passage which preferably runs essentially in the length direction in the driven shaft and by means of a supply system through switchable feed and discharge lines, at least one of which runs to the passage and at least one other of which runs to the converter circuit to feed it, characterized by the fact that when there is a flow of oil through the chamber 38, which oil, supplied by the converter circuit, has penetrated into the chamber 38 in the region of the friction lining 60, the oil can be guided radially inwardly to the discharge in the flow guide 70, so far in the direction of the converter axis 5 that the oil is fed into the passage 25 of the driven shaft 26, in a zone which promotes vortex formation when the converter housing 13 is in rotation, the zone being ring-shaped and surrounding the converter axis 5 in an annular fashion.

Another feature of the invention resides broadly in the torque converter characterized by the fact that the oil can be transported at a slight radial distance from the friction lining 60 to exert a cooling effect on the corresponding converter element 13, 18, in the contact area of the friction lining 60 by means of a feed line 62, 79, 82, 85, 87, 90, 93 into the chamber 38.

Yet another feature of the invention resides broadly in the torque converter with a friction lining which is designed for the flow of oil to perform a cooling action on the corresponding converter element with channels, characterized by the fact that the oil can be fed radially outside the friction lining 60 by means of the channels 62, 82 f 85 f 87, 90, 93 to the chamber 38.

Still another feature of the invention resides broadly in the torque converter characterized by the fact that the channels 82 are formed on both sides of a plate 44 located between the converter housing 13 and the piston 18, each of which is provided with a friction lining 60.

A further feature of the invention resides broadly in the torque converter characterized by the fact that the channels 62 are located on the sides of the converter housing 13 and piston 18 facing a plant 44 located between the converter housing 13 and the piston 18, while the plate 44 has a friction lining 60 on both sides.

Another feature of the invention resides broadly in the torque converter with a piston which can be brought into contact with the converter housing, characterized by the fact that there are channels 62 on one of the two converter elements (converter housing 13, piston 18) and a friction lining 60 on the other.

Yet another feature of the invention resides broadly in the torque converter characterized by the fact that the channels 85 are located inside a plate 44 which is located between the converter housing 13 and the piston 18 in the form of continuous openings.

Still another feature of the invention resides broadly in the torque converter characterized by the fact that on one of the converter elements 13, 18 there is at least one ring-shaped flow element 88 for the oil, which flow element 88 can be brought into engagement with a friction lining 60, and which has a channel 90 in the form of an Archimedean spiral.

A further feature of the invention resides broadly in the torque converter characterized by the fact that on one of the converter elements 13, 18 there is at least one ring-shaped flow element 91, 92 for the oil, which flow element can be brought into contact with a friction lining 60 and has a channel 93 in which there is an insert 94 which produces a drop in pressure.

Another feature of the invention resides broadly in the torque converter characterized by the fact that the insert 94 is formed by a braid made of sintered material.

Yet another feature of the invention resides broadly in the torque converter characterized by the fact that the insert 94 is formed by a steel braid.

Still another feature of the invention resides broadly in the torque converter characterized by the fact that the flow element 88 is located between a friction lining 60 of the converter housing 13 and a friction lining 60 of the piston 18, has elements 86 forming grooves 96 which are curved toward one another in the middle and one groove 96 which runs in the circumferential direction, which are welded to one another so that a channel 87 leading radially inward from the groove 96 between each two weld points empties into the chamber 38.

A further feature of the invention resides broadly in the torque converter characterized by the fact that the piston 18 is designed radially inside the friction lining 60 with openings 79 for the feed of the oil into the chamber 38.

Another feature of the invention resides broadly in the torque converter with a flow guide which is used for the passage of oil toward the chamber for the generation of a force which separates the piston from the converter housing, characterized by the fact that this flow guide 70 can carry a flow of oil intended for cooling the friction lining 60 in the opposite direction.

Yet another feature of the invention resides broadly in the torque converter characterized by the fact that the flow guide 70 is formed by a hole 37, 77.

Still another feature of the invention resides broadly in the torque converter characterized by the fact that the flow guide 70 is formed by a channel 69;100;107;113;114;117;128 which runs between two neighboring converter elements 71,66;13,101;13,103;106;13,112 and 112,15;115,15.

A further feature of the invention resides broadly in the torque converter characterized by the fact that the channel 69;100;107;113;114;117;128 is preferably formed by a depression in at least one of these converter elements 71,66;13,101;13,103;106;13,112 and 112,15;115,15.

Another feature of the invention resides broadly in the torque converter characterized by the fact that the flow guide 70 is formed by a tube 80 which exits the chamber 38 and empties in the vicinity of the converter axis 5.

Yet another feature of the invention resides broadly in the torque converter with a driven shaft open in the direction of an internal combustion engine, characterized by the fact that the flow guide 70 empties with its radially inner end axially tight up against this side of the driven shaft 26.

Still another feature of the invention resides broadly in the torque converter characterized by the fact that the flow guide 70 with its radially inner end, empties radially just outside a corresponding recess 120 which leads essentially radially to the passage 25 of the driven shaft 26 and made in the driven shaft 26.

A further feature of the invention resides broadly in the torque converter characterized by the fact that the flow guide 70 empties with its radially inner end close outside a corresponding notch 125, which is formed in a closure 108 for the passage 25 which axially covers the driven shaft 26 on its engine-side end.

Another feature of the invention resides broadly in the torque converter characterized by the fact that there is at least one seal 24 between the mouth of the flow guide 70 in the vicinity of the converter shaft 5 and a space A of the converter housing 13 connected to the turbine wheel 7.

Types of torque converters and components therefor, which may be utilized in accordance with the embodiments of the present invention may be found in the following U.S. patents: U.S. Pat. No. 4,478,323 to Weissenberger on Oct. 23, 1984, entitled "Hydrodynamic Clutch with Torsional Vibration Damping"; U.S. Pat. No. 4,437,551 to Gimmler on Mar. 20, 1984, entitled "Hydrodynamic Torque Converter"; U.S. Pat. No. 5,065,853 to Fujimoto et al. on Nov. 19, 1991, entitled "Lockup Clutch of Torque Converter"; U.S. Pat. No. 4,468,989 to Rosen on Sep. 4, 1984, entitled "Power Transmission Mechanism with a Hydrokinetic Torque Converter Having a Lockup Clutch"; U.S. Pat. No. 4,382,496 to Yamamori et al. on May 10, 1983, entitled "Torque Converter with Lockup Clutch Unit"; and U.S Pat. No. 4,071, 125 to Jameson on Jan. 31, 1978, entitled "Power Transmission with Torque Converter Lockup Clutch".

Additional types of torque converters which may be utilized in accordance with the present invention may be found in the following publications: German Laid Open Patent Applications DE-OS P 43 20 769.3 and DE-OS P 43 06 598.8 are hereby incorporated by reference as if set forth in their entirety herein.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application Nos. P 43 43 804.0, filed on Dec. 22, 1993, and P 43 23 640.9, filed on Jul. 6, 1994, having inventors Uwe Dehrmann, Peter Volland, Wolfgang Kundermann, Hans Wilhelm Wienholt, Ruthard Knoblach, and Herbert Schmid, and DE-OS P 43 43 804.0 and P 43 23 640.9 and P 43 43 804.0 and P 43 23 640.9, as well as their published equivalents, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A hydrokinetic lockup torque converter, such as for a motor vehicle, said torque converter comprising:

a power input shaft defining an axis of rotation and an axial direction parallel to said axis of rotation;

a power output shaft;

a converter housing, said converter housing having means for being driven by said power input shaft;

a turbine wheel being disposed within said converter housing;

said turbine wheel having means for being disposed on and for driving said power output shaft;

a pump wheel being disposed adjacent said turbine wheel, said pump wheel having means for being fastened to said converter housing;

lockup clutch means for coupling said turbine wheel to said converter housing;

said lockup clutch means having an engaged position wherein said turbine wheel is coupled to said converter housing;

said lockup clutch means having a disengaged position wherein said turbine wheel and said converter housing are uncoupled from one another;

said lockup clutch means comprising:

a piston being disposed between said converter housing and said turbine wheel, said piston and said converter housing defining a first chamber therebetween;

a second chamber having said pump wheel and said turbine wheel disposed therein;

at least one friction lining being disposed between a portion of said converter housing and a portion of said piston;

said at least one friction lining having means for contacting said converter housing and said piston in said engaged position of said lockup clutch means;

passage means for supplying and discharging converter fluid from said torque converter, said passage means being disposed adjacent said power output shaft;

flow guide means for connecting said first chamber to said passage means;

said flow guide means comprising means for substantially restricting, tangential movement of the converter fluid during its passage from said first chamber to said passage means and for reducing tangential movement of the converter fluid in said passage means;

said tangential movement being movement that is substantially tangent to a circle concentric with respect to the axis of rotation;

means for permitting flow of converter fluid from said second chamber into said first chamber in said engaged position of said lockup clutch means;

said means for permitting flow being disposed substantially adjacent said at least one friction lining; and said first chamber extending substantially between said means for permitting flow and said flow guide means.

2. The torque converter according to claim 1 wherein:

said means for substantially restricting comprises at least one flow guide channel, said at least one flow guide channel having a length; and said length of said at least one flow guide channel being sufficiently radially long such that said at least one flow guide channel extends sufficiently close to the axis of rotation to thereby substantially reduce the movement of the converter fluid under Coriolis acceleration.

3. The torque converter according to claim 2 wherein:

said at least one flow guide channel has a cross-sectional dimension substantially less than said length of said at least one flow guide channel; and said cross-sectional dimension being sufficiently small to thereby substantially reduce the movement of the converter fluid under Coriolis acceleration.

4. The torque converter according to claim 3 wherein:

said means for permitting flow is disposed substantially immediately adjacent said at least one friction lining; and said means for permitting flow comprises means for permitting a flow sufficient for cooling at least said converter housing, said turbine wheel, and said at least one friction lining.

5. The torque converter according to claim 4 wherein:

said means for permitting flow comprises at least one channel, said at least one channel extending between said second chamber and said first chamber;

said at least one channel has a first end and a second end;

said first end is disposed at said second chamber;

said second end is disposed at said first chamber;

said at least one friction lining has an outer circumferential dimension and an inner circumferential dimension disposed concentrically within said outer circumferential dimension;

said outer circumferential dimension is disposed substantially adjacent said first end of said at least one channel;

said inner circumferential dimension is disposed substantially adjacent said second end of said at least one channel;

said second chamber comprises a first portion disposed radially adjacent, with respect to said axis of rotation, said outer circumferential dimension of said at least one friction lining; and said first end of said at least one channel is configured for receiving converter fluid from said first portion of said second chamber in said engaged position of said lockup clutch means.

6. The torque converter according to claim 5 wherein:

said passage means is disposed substantially concentrically within said power output shaft;

said at least one flow guide channel is configured to direct a flow of converter fluid in a first direction from said passage means into said first chamber, the flow of converter fluid in said first direction for causing said piston to move away from said converter housing into said disengaged position of said lockup clutch means; and said at least one flow guide channel is configured to direct a flow of converter fluid in a second direction from said first chamber into said passage means in said engaged position of said lockup clutch means.

7. The torque converter according to claim 6 wherein:

said at least one flow guide channel is disposed substantially radially with respect to said passage means;

said torque converter comprises a zone disposed substantially concentrically about said axis of rotation and adjacent said axis of rotation and in fluid communication with said passage means;

said zone comprises a portion wherein a vortex of converter fluid can form during rotation of said converter housing due to Coriolis acceleration;

said at least one flow guide channel has a first end disposed at said first chamber and a second end disposed adjacent said passage means;

said second end of said at least one flow guide channel is disposed radially inside said zone to minimize formation of a vortex due to Coriolis acceleration upon the flow of converter fluid from said at least one flow guide channel into said zone.

8. The torque converter according to claim 7 wherein:

said portion of said converter housing and said portion of said piston, between which said at least one friction lining is disposed, respectively comprise a first portion and a second portion;

said at least one friction lining comprises two friction linings, said two friction linings being a first friction lining and a second friction lining;

said lockup clutch means further comprises
a friction plate disposed between said first portion of said converter housing and said second portion of said piston;
said friction plate having a first side and a second side disposed to face opposite one another;
said first friction lining is fastened to said first side of said friction plate;
said second friction lining is fastened to said second side of said friction plate;
means for attaching said friction plate to a portion of said turbine wheel;

said at least one channel comprises at least two channels, said at least two channels comprising a first channel and a second channel, said first channel is disposed in said first portion of said converter housing towards said first side of said friction plate; and said second channel is disposed in said second portion of said piston towards said second side of said friction plate.

9. The torque converter according to claim 7 wherein:

said portion of said converter housing and said portion of said piston, between which said at least one friction lining is disposed, respectively comprise a first portion and a second portion;

said at least one friction lining is fastened to one of:
said first portion of said converter housing and said second portion of said piston; and
said at least one channel is disposed in the other one of:
said first portion of said converter housing and said second portion of said piston, said at least one channel being disposed towards said friction lining.

10. The torque converter according to claim 7 wherein:

said portion of said converter housing and said portion of said piston, between which said at least one friction lining is disposed, respectively comprise a first portion and a second portion;

said torque converter comprises at least one of the following sets of characteristics a), b), c), d), e), f) and g):

a) said at least one channel comprises at least two channels, said at least two channels comprising a first channel and a second channel;
said lockup clutch means further comprises:
a friction plate disposed between said first portion of said converter housing and said second portion of said, piston;
said friction plate having a first side and a second side disposed to face opposite one another;
said first channel being disposed in said first side of said friction plate to face towards said first portion of said converter housing;
said second channel being disposed in said second side of said friction plate to face towards said second portion of said piston;
attaching means for non-rotationally attaching said friction plate to a portion of said turbine wheel;
said at least one friction lining comprises two friction linings, said two friction linings being a first friction lining and a second friction lining;
said first friction lining is fastened to said first portion of said converter housing; and
said second friction lining is fastened to said second portion of said piston;

b) said lockup clutch means further comprises:
a friction plate disposed between said first portion of said converter housing and said second portion of said piston;
said friction plate having a first side and a second side disposed to face opposite one another;
said at least one channel is disposed in said friction plate between said first side of said friction plate and said second side of said friction plate;
means for non-rotationally attaching said fraction plate to a portion of said turbine wheel;
said at least one friction lining comprises two friction linings, said two friction linings being a first friction lining and a second friction lining;

said first friction lining is fastened to said first portion of said converter housing to face said first side of said friction plate; and
said second friction lining is fastened to said second portion of said piston to face said second side of said friction plate; and c) said lockup clutch means further comprises:
a friction plate disposed between said first portion of said converter housing and said second portion of said piston;
said friction plate having an outer circumferential dimension and an inner circumferential dimension disposed concentrically within said outer circumferential dimension;
said friction plate comprising a first element and a second element disposed adjacent one another, said at least one channel being disposed between said first element and said second element;
said first element and said second element comprise bent portions bent towards the other of said first and second elements, said bent portions being disposed about midway between said outer circumferential dimension of said friction plate and said inner circumferential dimension of said friction plate;
each of said bent portions being configured to make contact with one another to position said first and second elements with respect to one another;
said at least one channel comprises substantially continuous circumferential portions and at least one radial channel connecting said continuous circumferential portions;
said at least one radial channel is disposed immediately adjacent said bent portions,
said first element and said second element are welded to one another at said bent portions;
means for non-rotationally attaching said friction plate to a portion of said turbine wheel;
said at least one friction lining comprises two friction linings, said two friction linings being a first friction lining and a second friction lining;
said first friction lining is fastened to said first portion of said converter housing; and
said second friction lining is fastened to said second portion of said piston;

d) said means for permitting flow further comprises a flow element in the form of a ring and being fastened to one of: said first portion of said converter housing and said second portion of said piston;
said at least one channel is disposed in said flow element to face one of: said first portion of said converter housing and said second portion of said piston;
said at least one channel comprises an Archimedean spiral, said Archimedean spiral spiraling around said axis of rotation and extending between said first end of said at least one channel and said second end of said at least one channel;
said at least one friction lining is fastened to one of the following A) and B):
A) said flow element; and
B) the other one of said first portion of said converter housing and said second portion of said piston;

e) said at least one channel comprises at least two channels, said at least two channels comprising a first channel and a second channel;
said lockup clutch means further comprises:

a friction plate disposed between said first portion of said converter housing and said second portion of said piston;
said friction plate having a first side and a second side disposed to face opposite one another;
attaching means for non-rotationally attaching said friction plate to a portion of said turbine wheel;
said cooling means further comprises:
  a first flow element fastened to said first portion of said converter housing; and
  a second flow element fastened to said second portion of said piston;
said first channel is disposed in said first flow element to face said first portion of said converter housing;
said second channel is disposed in said second flow element to face said second portion of said piston;
said first channel comprises an Archimedean spiral extending between said first end of said first channel and said second end of said first channel;
said second channel comprises an Archimedean spiral, said Archimedean spiral spiraling around said axis of rotation and extending between said first end of said second channel and said second end of said second channel;
said at least one friction lining comprises two friction linings, said two friction linings being a first friction lining and a second friction lining;
said first friction lining is fastened to said first flow element to face said first side of said friction plate; and
said second friction lining is fastened to said second flow element to face said second side of said friction plate;
f) said means for permitting flow further comprises a flow element in the form of a ring and being fastened to one of: said first portion of said converter housing and said second portion of said piston;
said at least one channel is disposed radially through said flow element;
said flow element comprises a braided insert, said braided insert being configured for slowing down the flow of converter fluid through said at least one channel;
said braided insert is disposed immediately adjacent said at least one channel;
said braided insert comprises one of: a sintered material and steel;
said at least one friction lining being fastened to one of C) and D):
  C) said flow element; and
  D) the other one of said first portion of said converter housing and said second portion of said piston; and
g) said at least one channel comprises at least two channels, said at least two channels comprising a first channel and a second channel;
said lockup clutch means further comprises:
  a friction plate disposed between said first portion of said converter housing and said second portion of said piston;
  said friction plate having a first side and a second side disposed to face opposite one another;
  attaching means for non-rotationally attaching said friction plate to a portion of said turbine wheel;
said means for permitting flow further comprises:
  a first flow element fastened to said first portion of said converter housing;
  a second flow element fastened to said second portion of said piston;
  said first channel is disposed radially through said first flow element;
  said second channel is disposed radially through said second flow element;
  said first flow element comprises a first braided insert disposed at said second end of said first channel, said first braided insert comprising one of: sintered material and steel;
  said second flow element comprises a second braided insert disposed between said first end of said second channel end said second end of said second channel, said second braided insert comprising one of: sintered material and steel;
said at least one friction lining comprises two friction linings, said two friction linings being a first friction lining and a second friction lining;
said first friction lining is fastened to said first flow element to face said first side of said friction plate; and
said second friction lining is fastened to said second flow element to face said second side of said friction plate.

11. The torque converter according to claim 8 wherein:
said at least two channels further comprises:
  a plurality of first channels disposed in said first portion of said converter housing to face said second side of said friction plate;
  a plurality of second channels disposed in said second portion of said piston to face said second side of said friction plate;
said converter housing comprises a third portion disposed radially inwardly from said first portion of said converter housing;
said torque converter further comprises:
  a bearing ring disposed substantially concentrically about said axis of rotation and between said converter housing and said turbine wheel; and
  a bearing neck, said bearing neck comprising said power input shaft;
  said bearing neck comprises means for being operatively attached to a crankshaft of an internal combustion engine;
said piston comprises a fourth portion disposed radially inwardly from said second portion of said piston;
said fourth portion of said piston comprises means for fastening said piston to said bearing ring, said piston being fastened to said bearing ring at said fourth portion;
said flow guide means comprises one of the following sets of characteristics h) and i):
  h) said at least one flow guide channel comprises at least one hole disposed within said bearing ring and extending between said passage means and said first chamber, said bearing ring comprising said bearing neck;
  said at least one hole is disposed at an angle with respect to said passage means;
  said at least one hole having a first end and a second end, said first end being disposed at said first chamber;
  said flow guide means additionally comprises:
    a blind hole disposed at said second end of said at least one hole;
    said blind hole is disposed within said bearing ring and said blind hole extends substantially axially from said second end of said at least one hole to said passage means; and i) said flow guide means comprises a portion of said bearing neck;

said portion of said bearing neck comprises a flanged portion extending from said bearing neck in a direction away from said axis of rotation, said flanged portion having a first end and a second end disposed at a distance from said first end;

said first end of said flanged portion is fastened to a portion of said bearing ring;

said flow guide means additionally comprises:
a cover plate disposed substantially adjacent said flanged portion;
said at least one flow guide channel being disposed between said cover plate and said flanged portion;
said at least one flow guide channel comprising at least one depression disposed in one of: said cover plate and said flanged portion;
said at least one depression having a first end and a second end disposed at a distance from said first end, said first end of said at least one depression being disposed at said first chamber;
said cover plate having a first end and a second end;
said first end of said cover plate is fastened to said third portion of said converter housing;
said second end of said cover plate is fastened to said bearing neck; and said flow guide means additionally comprises:
a blind hole disposed within said flanged portion and disposed in a portion of said bearing neck, said blind hole extending substantially axially from said second end of said at least one depression to said passage means.

12. The torque converter according to claim 11 wherein:

said at least one hole comprises a plurality of holes;

said at least one depression comprises a plurality of depressions;

said second chamber comprises a second portion disposed between said turbine wheel and said piston;

said torque converter further comprises:
at least one seal disposed between one of the following E) and F):
E) said second ends of said plurality of holes and said second portion of said second chamber; and
F) said second ends of said plurality of depressions and said second portion of said second chamber;
a stator disposed between said turbine wheel and said pump wheel, said stator having a first side facing said turbine wheel and a second side facing said pump wheel;
a first bearing and a second bearing;
said first bearing is disposed at said first side of said stator and said second bearing is disposed at said second side of said stator;

said power output shaft comprises a plurality of gear teeth extending radially from said power output shaft;

said means for being disposed on and for driving said power output shaft of said turbine wheel comprises:
a turbine hub disposed on said power output shaft;
said turbine hub is disposed substantially adjacent said bearing ring;
said turbine hub comprises a plurality of gear teeth extending radially inwardly from said turbine hub and for engaging with ones of said plurality of gear teeth of said power output shaft;

said bearing ring comprises a projection extending substantially parallel to said axis of rotation and towards said turbine wheel;

said torque converter further comprises:
a third bearing disposed between said turbine hub and said bearing ring;
a ring plate having a first end and a second end disposed at a distance from said first end;
said first end of said ring plate is disposed on said projection of said bearing ring;
said second end of said ring plate comprises leaf spring means for permitting axial movement of said piston with respect to said first portion of said converter housing;
said leaf spring means comprises a plurality of leaf springs, each of said plurality of leaf springs having a first end and second end;
said first ends of ones of said plurality of leaf springs are attached to said piston;
said second ends of ones of said plurality of leaf springs are attached to said ring plate; said passage means comprises a first end and a second end disposed at a substantial distance from said first end;

said first end of said passage means is disposed adjacent said blind hole;

said torque converter further comprises:
reservoir means for supplying and collecting converter fluid to and from said torque converter;
a support shaft disposed substantially concentrically about said power output shaft;
said power output shaft and said support shaft forming a space therebetween, said space being disposed substantially concentrically about said power output shaft;
a tube disposed substantially concentrically about said support shaft;
a portion of said tube is fastened to said converter housing;
valve means for selectively directing a flow of converter fluid into one of: said passage means and said space;
said valve means having a first position and a second position;
said first position of said valve means for causing the converter fluid to flow into said passage means in said first direction;
said second position of said valve means for causing the converter fluid to flow into said space and into said second portion of said second chamber;

said second end of said passage means is disposed adjacent said reservoir means; and one of: said second ends of ones of said plurality of holes and said second ends of ones of said plurality of depressions are disposed substantially immediately adjacent said first end of said passage means, such that there is a small axial distance between said second ends and said first end of said passage means.

13. The torque converter according to claim 9 wherein:

said at least one channel comprises a plurality of channels disposed in the other one of: said first portion of said converter housing and said second portion of said piston, said plurality of channels being disposed to face said at least one friction lining;

said second chamber comprises a second portion disposed between said piston and said turbine wheel;

said piston comprises a plurality of openings extending substantially parallel to said axis of rotation, said plurality of openings extending between said first chamber and said second portion of said second chamber;

said means for being disposed on and for driving said power output shaft of said turbine wheel comprises a turbine wheel hub;

said turbine wheel hub is disposed between said converter housing end said turbine wheel;

said piston further comprises a third portion disposed radially inwardly from said second portion of said piston;

said third portion of said piston comprises means for fastening said piston to said turbine wheel hub, said piston being fastened to said turbine wheel hub.

14. The torque converter according to claim 13 wherein:

said passage means comprises a first end and a second end;

said first end is disposed adjacent said flow guide means and said second end is disposed at an axial distance from said first end;

said converter housing comprises a fourth portion disposed radially inwardly from said first portion of said converter housing;

said torque converter further comprises:
 a bearing neck, said bearing neck comprising said power input shaft and comprising means for being operatively attached to a crankshaft of an internal combustion engine;

said flow guide means comprises one of the following sets of characteristics j), k), 1), m), n), o), p), q), r), s), and t):

j) said flow guide means comprises a portion of said bearing neck;

said portion of said bearing neck comprises a flanged portion extending from said bearing neck in a direction away from said axis of rotation to form an end portion thereof;

said end portion of said flanged portion is fastened to said fourth portion of said converter housing;

said at least one flow guide channel comprises at least one hole disposed within said flanged portion of said bearing neck, said at least one hole extending between said first chamber and said passage means;

said at least one hole is disposed at an angle with respect to said passage means;

said at least one hole has a first end and a second end, said first end being disposed at said first chamber;

a blind hole disposed within said bearing neck, said blind hole extending substantially axially from said second end of said at least one hole to said passage means;

said blind hole is disposed at said second end of said at least one hole;

k) said at least one flow guide channel comprises at least one tube having a first part and a second part;

said first part of said at least one tube extends in a direction substantially parallel to said axis of rotation;

said second part of said at least one tube extends in a direction substantially perpendicular to said axis of rotation;

said first part of said at least one tube comprises a first end portion, said first end portion penetrating into said converter housing at a point between said first portion of said converter housing and said fourth portion of said converter housing;

said flow guide means comprises a portion of said bearing neck;

said second part of said at least one tube comprises a second end portion, said second end portion penetrating into said portion of said bearing neck;

said portion of said bearing neck comprises a blind hole extending at least from said second end portion of said second part of said at least one tube to said passage means;

1) said flow guide means comprises a portion of said converter housing, said portion being a fifth portion and being disposed between said first portion of said converter housing and said fourth portion of said converter housing;

said fourth portion of said converter housing is disposed immediately adjacent said bearing neck;

a cover plate disposed between said turbine wheel hub and said fifth portion of said converter housing;

said at least one flow guide channel extending between said first chamber and said passage means and being disposed between said cover plate and said fifth portion of said converter housing;

said at least one flow guide channel comprises at least one depression in one of: said fifth portion of said converter housing and said cover plate;

m) said flow guide means comprises a portion of said converter housing, said portion being a fifth portion and being disposed between said first portion of said converter housing and said fourth portion of said converter housing;

said fourth portion of said converter housing is disposed immediately adjacent said bearing neck;

a cover plate disposed between said turbine wheel hub and said fifth portion of said converter housing;

said at least one flow guide channel extending between said first chamber and said passage means and being disposed between said cover plate and said fifth portion of said converter housing;

said at least one flow guide channel comprises at least one depression disposed in one of: said fifth portion of said converter housing and said cover plate;

said cover plate comprises a first end portion and a second end portion;

said first end portion is disposed substantially adjacent said passage means;

said second end portion is disposed substantially adjacent said first chamber;

said first end portion comprises a bent portion extending substantially parallel to said axis of rotation, said bent portion being configured for directing a flow of converter fluid from said at least one flow guide channel into said passage means;

n) said flow guide means comprises a first guide plate and a second guide plate disposed substantially parallel to one another;

said first guide plate and said second guide plate are disposed between said converter housing and said turbine wheel hub;

said at least one flow guide channel being disposed between said first guide plate and said second guide plate, said at least one flow guide channel extending between said first chamber and said passage means;

said at least one flow guide channel comprises at least one depression disposed in one of: said first guide plate and said second guide plate;

o) said flow guide means comprises a portion of said converter housing, said portion being a fifth portion and being disposed between said first portion of said converter housing and said fourth portion of said converter housing;

said fourth portion of said converter housing is disposed immediately adjacent said bearing neck;

a cover plate disposed between said turbine wheel hub and said fifth portion of said converter housing;

said at least one flow guide channel extending between said first chamber and said passage means and being disposed between said cover plate and said fifth portion of said converter housing;

said at least one flow guide channel comprises at least one depression in one of: said fifth portion of said converter housing and said cover plate, said at least one depression comprising a first end disposed at said first chamber and a second end disposed radially inwardly from said first end;

said at least one depression further comprises a hole disposed substantially perpendicular to said axis of rotation, said hole extending substantially from said second end of said at least one depression to said passage means;

p) said flow guide means comprises a portion of said converter housing, said portion being a fifth portion and being disposed between said first portion of said converter housing and said fourth portion of said converter housing;

said fourth portion of said converter housing is disposed immediately adjacent said bearing neck;

said flow guide means further comprises:
a ring disposed between said fifth portion of said converter housing and said turbine wheel hub;

said at least one flow guide channel comprises at least three passage portions, said at least three passage portions comprising a first, a second, and a third passage portion;

said first passage portion is disposed between said fifth portion of said converter housing and said ring;

said second passage portion is disposed between said turbine wheel hub and said ring;

said first and said second passage portions each comprise a first end portion disposed at said first chamber and a second end portion disposed at said third passage portion;

said third passage portion extends substantially from said second end portions of said first and second passage portions towards said passage means;

said third passage portion comprises at least one hole extending substantially perpendicular to said axis of rotation and extending substantially from said third passage portion to said passage means;

said first passage portion comprises at least one depression disposed in one of: said fifth portion of said converter housing and said ring;

said second passage portion comprises at least one depression disposed in one of: said ring and said turbine wheel hub;

q) said flow guide means comprises a portion of said converter housing, said portion being a fifth portion and being disposed between said first portion of said converter housing and said fourth portion of said converter housing;

said fourth portion of said converter housing is disposed immediately adjacent said bearing neck;

said flow guide means further comprises:
a spacer element disposed between said fifth portion of said converter element and said turbine wheel hub;

said at least one flow guide channel being disposed between said spacer element and said turbine wheel hub;

said at least one flow guide channel comprises at least one depression disposed in one of: said spacer element and said turbine wheel hub;

said at least one depression comprises a substantially straight portion disposed substantially perpendicular to said axis of rotation;

said flow guide means additionally comprises:
a portion of said power output shaft;

said portion of said power output shaft comprises at least one hole extending substantially perpendicular to said axis of rotation;

said at least one hole extends from said passage means towards said at least one depression, said at least one hole being in substantial axial alignment with said substantially straight portion of said at least one depression;

r) said flow guide means comprises a portion of said converter housing, said portion being a fifth portion and being disposed between said first portion of said converter housing and said fourth portion of said converter housing;

said fourth portion of said converter housing is disposed immediately adjacent said bearing neck;

said flow guide means further comprises:
a spacer element disposed between said fifth portion of said converter element and said turbine wheel hub;

said at least one flow guide channel being disposed between said spacer element and said turbine wheel hub;

said at least one flow guide channel comprises at least one depression disposed in one of: said spacer element and said turbine wheel hub;

said at least one depression comprises:
a substantially straight portion disposed substantially perpendicular to said axis of rotation and radially away from said axis of rotation;

an angled portion disposed at an angle with respect to said axis of rotation and disposed radially inwardly of said substantially straight portion;

said flow guide means further comprises:
a portion of said power output shaft;

said portion of said power output shaft comprises at least one hole extending substantially perpendicular to said axis of rotation;

said at least one hole extends from said passage means towards said at least one depression, said at least one hole being in substantial alignment with said angled portion of said at least one depression;

means for preventing a flow of converter fluid from entering said first end of said passage means such that the flow of converter fluid enters said passage means solely through said at least one hole of said power output shaft;

s) said flow guide means comprises a portion of said converter housing, said portion being a fifth portion and being disposed between said first portion of said converter housing and said fourth portion of said converter housing;

said fourth portion of said converter housing is disposed immediately adjacent said bearing neck;

said flow guide means further comprises:
a ring disposed between said fifth portion of said converter housing and said turbine wheel hub;

said at least one flow guide channel comprises at least three passage portions, said at least three passage portion comprising a first, a second, and a third passage portion;

said first passage portion is disposed between said fifth portion of said converter housing and said ring;

said second passage portion is disposed between said turbine wheel hub and said ring;

said first and said second passage portions each comprise a first end portion disposed at said first chamber and a second end portion disposed at said third passage portion;

said third passage portion extends substantially from said second end portions of said first and second passage portions towards said passage means;

said first passage portion comprises at least one depression disposed in one of: said fifth portion of said converter housing and said ring;

said second passage portion comprises at least one depression disposed in one of: said ring and said turbine wheel hub;

second means for permitting a flow of converter fluid from said at first, second and third passage portions to enter said first end of said passage means;

said second means for permitting of said flow guide means comprises a grooved portion having a first part and a second part;

said first part of said grooved portion is disposed substantially perpendicular to said axis of rotation, said first part being disposed immediately adjacent said third passage portion;

said second part of said grooved portion is disposed substantially parallel to said axis of rotation, said second part being disposed immediately adjacent said first end of said passage means; and t) said flow guide means comprises a portion of said converter housing, said portion being a fifth portion and being disposed between said first portion of said converter housing and said fourth portion of said converter housing;

said fourth portion of said converter housing is disposed immediately adjacent said bearing neck;

said flow guide means further comprises:
a ring disposed between said fifth portion of said converter housing and said turbine wheel hub;
said at least one flow guide channel comprises at least three passage portions, said at least three passage portions comprising a first, a second, and a third passage portion;
said disc comprises a hole extending in a direction substantially parallel to said axis of rotation and extending between said first passage portion and said second passage portion;
said first passage portion is disposed between said fifth portion of said converter housing and said ring;
said second passage portion is disposed between said turbine wheel hub and said ring;
said first and said second passage portions each comprise a first end portion disposed at said first chamber;
said first passage portion comprises a second end portion disposed at said hole of said ring;
said second passage portion comprises a second end portion disposed at said third passage portion;
said third passage portion extends substantially from said second end portion of said second passage portion towards said passage means;

said first passage portion comprises at least one depression disposed in one of: said fifth portion of said converter housing and said ring;
said second passage portion comprises at least one depression disposed in one of: said disc and said turbine wheel hub;
second means for permitting a flow of converter fluid from said first, second and third passage portions to enter said first end of said passage means;
said second means for permitting of said flow guide means comprises a grooved portion having a first part and a second part;
said first part of said grooved portion is disposed substantially perpendicular to said axis of rotation, said first part being disposed immediately adjacent said third passage portion; and
said second part of said grooved portion is disposed substantially parallel to said axis of rotation, said second part being disposed immediately adjacent said first end of said passage means.

15. The torque converter according to claim 14 wherein:

said at least one hole comprises a plurality of holes;

said at least one depression comprises a plurality of depressions;

said at least one hole of said third passage portion comprises a plurality of holes;

said at least one hole of said power output shaft comprises a plurality of holes;

said second chamber comprises a portion disposed between said turbine wheel and said piston;

said torque converter further comprises:
a stator disposed between said turbine wheel and said pump wheel, said stator having a first side facing said turbine wheel and a second side facing said pump wheel;
a first bearing and a second bearing;
said first bearing is disposed at said first side of said stator and said second bearing is disposed at said second side of said stator;

said power output shaft comprises a plurality of gear teeth extending radially from said power output shaft;

said means for being disposed on and for driving said power output shaft of said turbine wheel comprises:
a turbine hub disposed on said power output shaft;
said turbine hub comprises a plurality of gear teeth extending radially inwardly from said turbine hub and for engaging with ones of said plurality of gear teeth of said power output shaft;

said torque converter further comprises:
reservoir means for supplying and collecting converter fluid to and from said torque converter;
a support shaft disposed substantially concentrically about said power output shaft;
said power output shaft and said support shaft forming a space therebetween, said space being disposed substantially concentrically about said power output shaft;
a tube disposed substantially concentrically about said support shaft;
a portion of said tube is fastened to said converter housing;
valve means for selectively directing a flow of converter fluid into one of: said passage means and said space;
said valve means having a first position and a second position;

said first position of said valve means for causing the converter fluid to flow into said passage means in said first direction;

said second position of said valve means for causing the converter fluid to flow into said space and into said second portion of said second chamber;

said second end of said passage means is disposed adjacent said reservoir means; and one of: said second ends of ones of said plurality of holes and said second ends of ones of said plurality of depressions are disposed substantially immediately adjacent said first end of said passage means, such that there is a small axial distance between said second ends and said first end of said passage means.

16. A hydrokinetic lockup torque converter, such as for a motor vehicle, said torque converter comprising:

a power input shaft defining an axis of rotation and an axial direction parallel to said axis of rotation;

a power output shaft;

a converter housing, said converter housing having means for being driven by said power input shaft;

a turbine wheel being disposed within said converter housing;

said turbine wheel having means for being disposed on and for driving said power output shaft;

a pump wheel being disposed adjacent said turbine wheel and having means for being fastened to said converter housing;

lockup clutch means for coupling said turbine wheel to said converter housing;

said lockup clutch means having an engaged position wherein said turbine wheel is coupled to said converter housing;

said lockup clutch means having a disengaged position wherein said turbine wheel and said converter housing are uncoupled from one another;

said lockup clutch means comprising:

a piston being disposed between said converter housing and said turbine wheel, said piston and said converter housing defining a first chamber therebetween;

a second chamber having said pump wheel and said turbine wheel disposed therein;

at least one friction lining being disposed between a portion of said converter housing and a portion of said piston;

said at least one friction lining having means for contacting said converter housing and said piston in said engaged position of said lockup clutch means;

passage means for supplying and discharging converter fluid from said torque converter, said passage means being disposed adjacent said power output shaft;

flow guide means for connecting said first chamber to said passage means;

said flow guide means comprising at least one flow guide channel, said at least one flow guide channel having a length and a cross-sectional dimension;

said length of said at least one flow guide channel being substantially greater than said cross-sectional dimension of said at least one flow guide channel;

means for permitting flow of converter fluid from said second chamber into said first chamber in said engaged position of said lockup clutch means;

said means for permitting flow being disposed in the vicinity of said at least one friction lining; and said first chamber extending substantially between said means for permitting flow and said flow guide means.

17. A method of operating a hydrokinetic lockup torque converter, such as for a motor vehicle, the torque converter comprising: a power input shaft defining an axis of rotation and an axial direction parallel to the axis of rotation; a power output shaft; a converter housing, the converter housing having means for being driven by the power input shaft; a turbine wheel being disposed within the converter housing; the turbine wheel having means for being disposed on and for driving the power output shaft; a pump wheel being disposed adjacent the turbine wheel and having means for being fastened to the converter housing; lockup clutch means for coupling the turbine wheel to the converter housing; the lockup clutch means having an engaged position wherein the turbine wheel is coupled to the converter housing; the lockup clutch means having a disengaged position wherein the turbine wheel and the converter housing are uncoupled from one another; the lockup clutch means comprising: a piston being disposed between the converter housing and the turbine wheel; the piston and the converter housing defining a first chamber therebetween; a second chamber having the pump wheel and the turbine wheel disposed therein; at least one friction lining being disposed between a portion of the converter housing and a portion of the piston; the at least one friction lining having means for contacting the converter housing and the piston in said engaged position of the lockup clutch means; passage means for supplying and discharging converter fluid to and from the torque converter, the passage means being disposed adjacent the power output shaft; flow guide means for connecting the first chamber to the passage means; the flow guide means comprising means for substantially restricting tangential movement of the converter fluid during its passage from the first chamber to the passage means and for reducing tangential movement of the converter fluid in the passage means the tangential movement being movement that is, substantially tangent to a circle concentric with respect to the axis of rotation; means for permitting flow of converter fluid from the second chamber into the first chamber in the engaged position of the lockup clutch means; the means for permitting flow being disposed substantially adjacent the at least one friction lining; and the first chamber extending substantially between the means for permitting flow and the flow guide means; said method comprising the steps of:

providing a power input shaft defining an axis of rotation and an axial direction parallel to the axis of rotation;

providing a power output shaft;

providing a converter housing, the converter housing having means for being driven by the power input shaft;

providing a turbine wheel, the turbine wheel having means for being disposed on and for driving the power output shaft;

providing a pump wheel, the pump wheel having means for being fastened to the converter housing;

providing lockup clutch means for coupling the turbine wheel to the converter housing, the lockup clutch means having an engaged position wherein the turbine wheel is coupled to the converter housing, and a disengaged position wherein the turbine wheel and the converter housing are uncoupled from one another;

said step of providing the lockup clutch means further comprises:

providing a piston, the piston and the converter housing defining a first chamber therebetween;

providing a second chamber;

providing at least one friction lining, the at least one friction lining having means for contacting the converter housing and the piston in the engaged position of the lockup clutch means;

providing passage means for transporting converter fluid to and from the torque converter;

providing flow guide means for connecting the first chamber to the passage means;

said step of providing the flow guide means further comprises providing means for substantially restricting movement of the converter fluid during its passage from the first chamber to the passage means and for reducing tangential movement of the converter fluid in the passage means, the tangential movement being movement that is tangent to a circle concentric with respect to the axis of rotation;

providing means for permitting flow of converter fluid from the second chamber into the first chamber in the engaged position of the lockup clutch means;

said method further comprising the steps of:

driving the converter housing with the power input shaft with the means for being driven of the converter housing;

transporting converter fluid to the torque converter and transporting converter fluid from the torque converter with the passage means;

driving the power output shaft with the means for being disposed on and for driving of the turbine wheel;

engaging and disengaging the turbine wheel and the converter housing with the lockup clutch means;

contacting the piston and the converter housing in the engaged position of the lockup clutch means with the means for contacting of the at least one friction lining; and permitting converter fluid to flow from the second chamber into the first chamber in the engaged position of the lockup clutch means; and substantially restricting, with the means for substantially restricting, tangential movement of the converter fluid during its passage from the first chamber to the passage means and reducing tangential movement of the converter fluid in the passage means.

18. The method according to claim 17 further comprising providing the means for substantially restricting with at least one flow guide channel having a length sufficiently radially long such that the at least one flow guide channel extends sufficiently close to the axis of rotation and thereby:

substantially reducing the movement of the converter fluid under Coriolis acceleration.

19. The method according to claim 18 further comprising providing the at least one flow guide channel with a cross-sectional dimension which is substantially less than the length of the at least one flow guide channel, the cross-sectional dimension of the at least one flow guide channel being sufficiently small and thereby:

substantially reducing the movement of converter fluid under Coriolis acceleration.

20. The method according to claim 19 further comprising:

the means for permitting being disposed substantially immediately adjacent the at least one friction lining; the means for permitting flow comprising at least one channel, and the at least one channel extending between the second chamber and the first chamber; the at least one channel having a first end and a second end; the first end being disposed at the second chamber; the second end being disposed at the first chamber; the at least one friction lining having an outer circumferential dimension and an inner circumferential dimension disposed concentrically within the outer circumferential dimension; the outer circumferential dimension being disposed substantially adjacent the first end of the at least one channel; the inner circumferential dimension being disposed substantially adjacent the second end of the at least one channel; the second chamber comprising a first portion disposed radially adjacent, with respect to the axis of rotation, the outer circumferential dimension of the at least one friction lining; the first end of the at least one channel for receiving converter fluid from the first portion of the second chamber in the engaged position of the lockup clutch means; the passage means being disposed substantially concentrically within the power output shaft; the at least one flow guide channel of the flow guide means being disposed substantially radially with respect to the passage means; the at least one flow guide channel having a first end disposed at the first chamber and a second end disposed adjacent the passage means;

cooling at least the converter housing, the turbine wheel, and the at least one friction lining with the means for permitting flow;

receiving converter fluid, with the first end of the at least one channel, from the first portion of the second chamber in the engaged position of the lockup clutch means;

directing, with the at least one flow guide channel of the flow guide means, a flow of converter fluid in a first direction from the passage means into the first chamber and causing the piston to move away from the converter housing into the disengaged position of the lockup clutch means;

directing, with the at least one flow guide channel of the flow guide means, a flow of converter fluid in a second direction from the first chamber into the passage means in the engaged position of the lockup clutch means;

the torque converter having a zone concentric with respect to the axis of rotation and adjacent the axis of rotation;

communicating fluid between the zone and the passage means; the zone having a portion wherein a vortex of converter fluid can form during rotation of the converter housing due to Coriolis acceleration; and minimizing the formation of a vortex due to Coriolis acceleration upon the flow of converter fluid from the at least one flow guide channel into the zone, by flowing the converter fluid through the second end of the at least one flow guide channel and radially inside the zone.

* * * * *

UNITED STATES PATENT AND TRADEMARK OFFICE
CERTIFICATE OF CORRECTION

PATENT NO. : 5,575,363              Page 1 of 2
DATED : November 19, 1996
INVENTOR(S) : Uwe DEHRMANN, Peter VOLLAND, Wolfgang KUNDERMANN, Hans Wilhelm WIENHOLT, Ruthard KNOBLACH and Herbert SCHMID It is certified that error appears in the above-indentified patent and that said Letters Patent is hereby corrected as shown below:

In column 4, line 61, after 'used,', delete "far" and insert --for--.

In column 5, line 64, after 'output', delete "shafts" and insert --shaft;--.

In column 6, line 13, after 'chamber', delete "there between;" and insert --therebetween;--.

In column 7, line 61, after 'detail', delete "end" and insert --and--.

In column 18, line 16, after '62,', delete "82 f 85 f" and insert --82, 85,--.

In column 29, line 8, Claim 13, after 'housing', delete "end" and insert --and--.

In column 29, line 30, Claim 14, after 'k),', delete "1)," (the number 1) and insert --1),-- (lowercase letter L).

UNITED STATES PATENT AND TRADEMARK OFFICE
CERTIFICATE OF CORRECTION

PATENT NO. : 5,575,363
DATED : November 19, 1996
INVENTOR(S) : Uwe DEHRMANN, Peter VOLLAND, Wolfgang KUNDERMANN, Hans Wilhelm WIENHOLT, Ruthard KNOBLACH and Herbert SCHMID It is certified that error appears in the above-indentified patent and that said Letters Patent is hereby corrected as shown below:

In column 30, line 10, Claim 14, before the first occurrence of 'said', delete "1)" (the number 1) and insert --l)-- (the lowercase letter L).

In column 31, line 38, Claim 14, after the first occurrence of 'said', delete "second,passage" and insert --second passage--.

Signed and Sealed this

Fourth Day of March, 1997

Attest:

BRUCE LEHMAN

Attesting Officer

Commissioner of Patents and Trademarks